United States Patent
Tanpoco

(10) Patent No.: US 7,702,569 B1
(45) Date of Patent: *Apr. 20, 2010

(54) SYSTEM AND METHOD FOR ICON ORIENTED REPRESENTATION OF TRADING STRATEGIES

(75) Inventor: Alvin F. Tanpoco, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/416,399

(22) Filed: May 2, 2006

Related U.S. Application Data

(63) Continuation of application No. 10/749,000, filed on Dec. 30, 2003, now abandoned.

(60) Provisional application No. 60/504,947, filed on Sep. 22, 2003.

(51) Int. Cl.
G06Q 40/00 (2006.01)

(52) U.S. Cl. .......................................... 705/37; 705/35

(58) Field of Classification Search .............. 705/35–45
See application file for complete search history.

(56) References Cited

U.S. PATENT DOCUMENTS

| | | | |
|---|---|---|---|
| 6,061,662 A | | 5/2000 | Makivic |
| 6,112,189 A * | | 8/2000 | Rickard et al. ............. 705/36 R |
| 6,691,094 B1 * | | 2/2004 | Herschkorn ................... 705/37 |
| 6,772,132 B1 | | 8/2004 | Kemp, II et al. |
| 7,127,424 B2 | | 10/2006 | Kemp, II et al. |
| 7,146,336 B2 | | 12/2006 | Olsen et al. |
| 7,228,289 B2 | | 6/2007 | Brumfield et al. |
| 7,389,268 B1 | | 6/2008 | Kemp, II et al. |
| 2002/0055899 A1 * | | 5/2002 | Williams ..................... 705/37 |
| 2002/0105550 A1 | | 8/2002 | Biebesheimer et al. |
| 2002/0120551 A1 * | | 8/2002 | Jones, III ..................... 705/37 |
| 2002/0156718 A1 | | 10/2002 | Olsen et al. |
| 2003/0004853 A1 * | | 1/2003 | Ram et al. .................... 705/37 |
| 2003/0050800 A1 * | | 3/2003 | Brandt et al. ................. 705/2 |
| 2003/0069826 A1 | | 4/2003 | Guidi et al. |
| 2004/0006528 A1 | | 1/2004 | Fung |
| 2005/0004852 A1 * | | 1/2005 | Whitney ..................... 705/35 |
| 2005/0080701 A1 | | 4/2005 | Tunney et al. |
| 2005/0165670 A1 * | | 7/2005 | Woodmansey et al. ........ 705/37 |
| 2007/0174173 A1 | | 7/2007 | Brucato |

OTHER PUBLICATIONS

Pending U.S. Appl. No. 11/409,346, filed Apr. 21, 2006.
Pending U.S. Appl. No. 10/749,000, filed Dec. 30, 2003.

(Continued)

*Primary Examiner*—James Kramer
*Assistant Examiner*—Rajesh Khattar
(74) *Attorney, Agent, or Firm*—McDonnell Boehnen Hulbert & Berghoff LLP

(57) ABSTRACT

A system and method for visually establishing a trading strategy are described. According to one method, a trader can position a first icon corresponding to a first order and a second icon corresponding to a second order in relation to a first value axis displayed on a graphical interface. A graphical means can also be used in relation to the icons to show that the icons correspond to a trading strategy. The graphical means can include lines, numbers, or any other user-configurable graphical representation illustrating order precedence, for example.

24 Claims, 16 Drawing Sheets

OTHER PUBLICATIONS

Pending U.S. Appl. No. 11/415,888, filed May 2, 2006.
Pending U.S. Appl. No. 11/417,873, filed May 3, 2006.

William Blair Employee, Concentrated Stock Positions: Managing Risk and Reward, William Blair & Company, Sep. 2008, pp. 1-16.

* cited by examiner

 LIMIT ORDER 502
 STOP ORDER 504
 STOP LIMIT ORDER 506
 TRAILING STOP ORDER 508
STOP AND REVERSE ORDER 510
 MARKET ORDER 512
FIG. 5

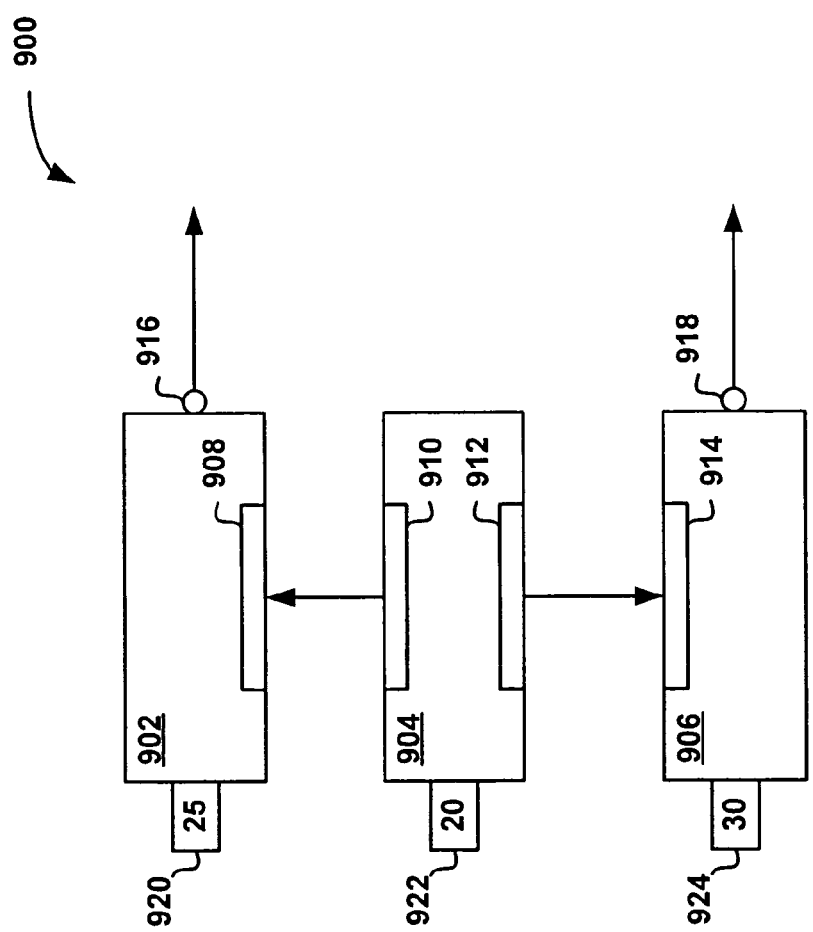

SYSTEM AND METHOD FOR ICON ORIENTED REPRESENTATION OF TRADING STRATEGIES

CROSS REFERENCE TO RELATED APPLICATION

The present application is a continuation of U.S. patent application Ser. No. 10/749,000 filed Dec. 30, 2003 now abandoned which claims priority to U.S. Provisional Patent Application No. 60/504,947, entitled "Icon Object Oriented Execution Interface" filed on Sep. 22, 2003, the contents of which are incorporated herein by reference.

FIELD OF INVENTION

The present invention is directed towards electronic trading. More specifically, the present invention is directed towards icon object oriented execution interface and trading using thereof.

BACKGROUND

In recent years, a trend towards electronic trading has become well-established, causing one major exchange after another to replace or at least supplement the traditional open outcry, where a trade is done face to face, with automated, electronic systems which automatically match bids and offers. While the motivation behind using electronic trading may vary from market to market, greater efficiency and volume are some of the considerations.

In particular, subscribing traders are connected to an exchange's electronic trading platform by way of a communication link and through an application program interface to facilitate real-time electronic messaging between themselves and the exchange. The electronic messaging includes market information that is sent from the electronic market to the traders. Market information commonly includes information regarding the inside market and market depth. The inside market is the lowest sell price in the market and the highest buy price in the market at a particular point in time. Market depth refers to quantities available at the inside market and may also refer to quantities available at other prices away from the inside market. The quantity available at a given price level is usually provided by the host exchange in aggregate sums. In other words, a host exchange usually provides the total buy or the total sell quantity available in the market at a particular price level in its data feed. The extent of the market depth available to a trader usually depends on the host exchange. For instance, some host exchanges provide market depth for all or many price levels, while some provide only quantities associated with the inside market, and others may provide no market depth at all. Additionally, host exchange can offer other types of market information such as the last traded price ("LTP"), or the last traded quantity ("LTQ").

Just as with an open-outcry exchange, an electronic exchange can list any number of tradeable objects. Often times, traders will simultaneously trade more than one tradeable object, and they may simultaneously trade tradeable objects that are listed at more than one exchange. Ordinarily, each tradeable object has its own separate stream of market information. Therefore, in these instances, the traders will generally receive more than one stream of market information such that each stream of market information attempts to characterize a given tradeable object.

Once the traders receive market information, the market information may be displayed to them on their trading screens. Upon viewing the information, traders take certain actions including the actions of sending buy or sell orders to the electronic market, adjusting existing orders, deleting orders, or otherwise managing orders. In general, traders may use trading screens to enter orders into the market, and to obtain and view market information. Traders may also use software tools on their client devices to automate these and additional actions.

To profit in electronic markets, however, market participants must be able to assimilate large amounts of data, including market information, and react to the received data more quickly than other competing market participants. It is therefore desirable to offer user-friendly tools that can assist a market participant in making desirable trades.

BRIEF DESCRIPTION OF THE DRAWINGS

Example embodiments of the present invention are described herein with reference to the following drawings, in which:

FIG. 5 is a block diagram illustrating a plurality of graphical icons that can be used to represent a plurality of order types;

FIG. 9 is a block diagram illustrating another example embodiment of a trading strategy defined using a plurality of order execution icons;

DETAILED DESCRIPTION

I. Icon Oriented Representation of Trading Strategies

The present invention includes methods, systems, and graphical interfaces that provide tools that can be used by a trader for electronic trading. By using preferred embodiments, a trader is provided tools that can assist the trader in making desirable trades and in configuring and monitoring orders in a user-friendly manner.

In one preferred embodiment, a graphical interface for visually establishing trading strategies is provided that enables a trader to quickly and effectively establish and view status of the trading strategies. In one embodiment, the graphical interface may include a value axis, such as a price axis or any price derivative axis, that a trader may use as a reference to establish a trading strategy. Preferably, the graphical interface also includes a toolbar that can be used to display a plurality of icons associated with a plurality of order types that are provided by an electronic exchange in relation to a tradeable object selected by a trader for trading. According to one example embodiment, a trader could establish a trading strategy by positioning a first icon in relation to any point on the value axis, such as in relation to any price level displayed in relation to a price axis. Then, the trader could select at least one second icon to be part of the trading strategy, and the at least one second icon could also be positioned on the graphical interface. According to a preferred embodiment, the graphical interface also displays graphical means in relation to the selected icons, and the graphical means is preferably used to visually show a relationship between the orders associated with the icons corresponding to the created trading strategy. As will be described in greater detail below, the relationship between the orders may indicate order execution precedence, such as order dependency. However, different relationships between the orders could also be shown using the graphical means. Also, the graphical means could take many different formats, including, but not limited to arrows linking the indicators and showing the order precedence, or any numerical or other indicator types displayed in relation to the order indicators corresponding to the created trading strategy.

While the present invention is described herein with reference to illustrative embodiments for particular applications, it should be understood that the present invention is not limited thereto. Those having ordinary skill of art will recognize that many additional modifications and embodiments are possible as well.

II. Hardware and Software Overview

Figure 1:
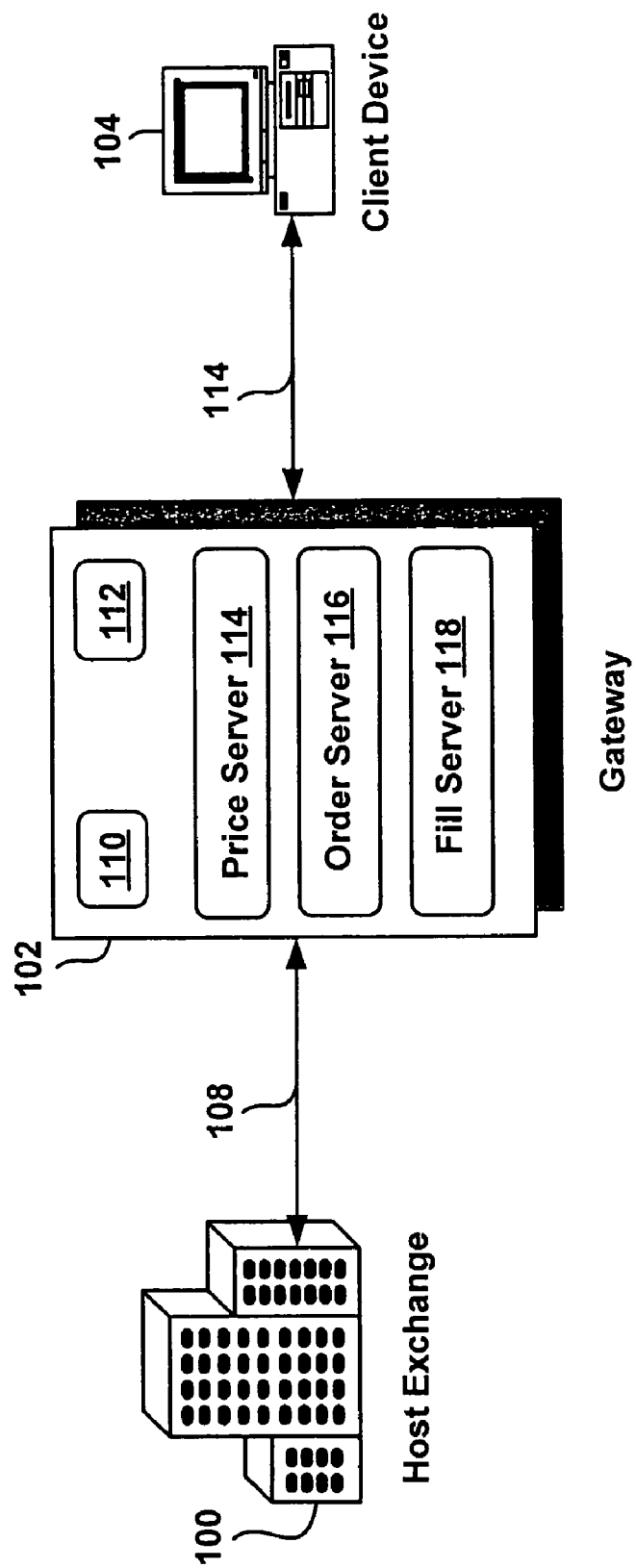
FIG. 1 is an example network configuration for a communication system utilized to access one or more exchanges.

FIG. 1 is a block diagram illustrating an example trading system in accordance with the preferred embodiments. The system includes a host exchange 100, a gateway 102, and a client device 104. FIG. 1 illustrates a single client device that is connected to a single exchange via a gateway; however, it should be understood that a plurality of client devices could connect to a plurality of exchanges via a plurality of gateways.

Although each referenced component in FIG. 1 is described directly below in their respective sections, it should be understood that the components may take the form of an entirely hardware embodiment, an entirely software embodiment, or an embodiment combining software and hardware aspects. Furthermore, some of the components of FIG. 1 may take the form of a computer readable medium having a computer readable program code means embodied in a storage medium. Any suitable computer readable medium may be utilized including hard disks, CD-ROMS, optical storage devices, or magnetic storage devices. Also, it should be understood that the preferred embodiment may be implemented on many other system configurations.

A. Exchange

According to one example embodiment, host exchange 100 may include basic or more complex systems that automatically match incoming orders. Some example exchanges include the London International Financial Futures and Options Exchange ("LIFFE"), the Chicago Board of Trade ("CBOT"), the Chicago Mercantile Exchange ("CME"), the Exchange Electronic Trading ("Xetra," a German stock exchange), the European exchange ("Eurex"), or Euronext. Exchange 100 might also refer to other known or later developed facilities that automatically match incoming orders that are received from client devices. The example exchanges and other exchanges are well known in the art.

Exchange 100 allows traders to trade tradeable objects that exchange 100 offers for trading. As used herein, the "tradeable object" refers simply to anything that can be traded with a quantity and/or price. It includes, but is not limited to, all types of tradeable objects such as financial products, which can include, for example, stocks, options, bonds, futures, currency, and warrants, as well as funds, derivatives, and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of tradeable objects, such as a class of tradeable objects.

According to the preferred embodiments, to keep participating traders informed of changes in a market, exchange 100 relays market information over a transmission channel 108 to client device 104 via gateway 102. Transmission channel 108 can include any connection types being used by exchange 100, such as a T1 line, for example, and the transmission channel can carry information in either analog or digital format. It should be understood that exchange 100 could use a number of different communication protocols for connecting and sending market information to client devices. For example, exchange 100 can connect to client device 104 via gateway 102 using TCP/IP, and can provide market information using the Financial Information Exchange ("FIX") protocol, which is a messaging standard developed specifically for real-time electronic exchange type transactions. FIX is a public-domain specification owned and maintained by FIX Protocol, Ltd.

Market information that exchange 100 sends to client device 104 via gateway 102 may include data that represents just the inside market, where the inside market is the lowest sell price (best offer) in the market, and the highest buy price (best bid) in the market at a particular point in time. Market information may also include market depth, where market depth refers to quantities available at the inside market and can also refer to quantities available at other prices away from the inside market. It should be understood that market information can also contain other types of market information such as the last traded price ("LTP"), or the last traded quantity ("LTQ"). Additionally, the market information that is sent to a single trader may include order and/or fill information related to orders associated with that trader.

Once a trader submits an order to an exchange, the exchange may process the order using different execution algorithms, and the type of the algorithm used may depend on the tradeable object being traded. Some example order execution algorithms include first-in-first-out ("FIFO") and pro-rata algorithms. The FIFO algorithm, used for some tradeable objects listed with Eurex, for example, gives priority to the first person in an order queue at an exchange to place an order. The pro rata algorithm, used for some tradeable objects listed with LIFFE, for example, splits orders for the same price, and the orders at identical prices are filled in proportion to their size. Also, it should be understood that the price order queue is a term that covers a broad range of systems used by an exchange to conduct orderly financial transactions such as, for example, a FIFO based system or a pro rata system. Also, the present invention is not limited to any particular type of order execution algorithm, and different algorithms could also be used.

B. Gateway

According to the preferred embodiment, gateway 102 can be a computer running software that receives market information and order information from host exchange 100. As used herein, a computer includes any device with memory 110 and a processor 112 capable of processing information to produce a desired result. Thus, gateway 102 can be a computer of any size such as a server, workstation, personal computer, or laptop, but, generally, gateway 102 can be any computer device that has the processing capability to perform the function described herein. Also, it should be understood that the functions of gateway 102 could be moved to host exchange 100 and/or client device 104 to reduce or eliminate the need for gateway 102.

In the preferred embodiment, gateway 102 receives market information as well as order related data from host exchange 100, and forwards the received data to client device 104. In one embodiment, while market information may be transmitted between exchange 100 and client device 104 using multicast transmission, order related information, such as order fills, order requests, or order modification requests are typically sent using unicast transmission. As known in the art, while the multicast allows for communication between a single sender and multiple receivers in the network, the unicast only allows for communication between a single sender and a single receiver. It should be understood that while there are many possible protocols that can be used to multicast and unicast information between exchange 100 and client device 104 via gateway 102, the Pragmatic General Multicast ("PGM") protocol could be used for multicasting, and the Point to Point Protocol ("PPP") could be used for unicasting, for example.

Also, as known by those skilled in the art, gateway 102 may have one or more servers to support data feeds that are received from exchange 100. In one embodiment, gateway 102 may include a price server 114 for processing price information, an order server 116 for processing order information, and a fill server 118 for processing fill information. Generally, a server is software that responds to commands from client device 104 in form of subscription. That is, a trader at client device 114 can subscribe to price information, order information, and fill information for a particular tradeable object being offered at host exchange 100. In one embodiment, the subscription may be established via a process of sending a number of messages between client device 104 and gateway 102. For example, gateway 102 may first authenticate a trader at client device 104, and then client device 104 may establish separate communication links, such as IP links, to each server at gateway 102. In the embodiment illustrated in FIG. 1, client device 104 would establish three separate IP connections to three servers at gateway 102.

Price server 114, order server 116, and fill server 118 receive information from exchange 100. According to a preferred embodiment, price server 114 may receive and process price information related to one or more tradeable objects being offered at exchange 100, while order server 116 may receive and process order related information. In one embodiment, exchange 100 may be connected to gateway 102 using two communication links, a first link between exchange 100 and price server 114, and a second link between exchange 100 and order server 116. In such an embodiment, a separate connection may exist between order server 116 and fill server 118 such that, when the order information that is received at order server 116 includes any fill related information, order server 116 may pass the fill data to fill server 118, which may then process and send the fill data to client device 104. It should be understood that the gateway configuration described above is only one example, and different implementations are possible as well.

C. Client Device

Client device 104 can be a computer, such as a workstation, desktop, laptop, handheld device, and so forth, that allow a trader to trade one or more tradeable objects that are offered at exchange 100. Client device 104 may include at least processor and memory. The processor and memory, which are both well-known computer components, are not shown in the Figure for sake of clarity. Preferably, the processor has enough processing power to handle and process various types of market information. The more market information is received and processed, the more processing power is preferred. However, any present day processor has enough capability to perform at least the most basic part of the present invention.

Memory may include a computer readable medium. The term computer readable medium, as used herein, refers to any medium that participates in providing instructions to a processor unit for execution. Such a medium may take many forms, including but not limited to, non-volatile media, and transmission media. Non-volatile media include, for example, optical or magnetic disks, such as storage devices. Volatile media include, for example, dynamic memory, such as main memory or random access memory ("RAM"). Common forms of computer readable media include, for example, floppy disks, flexible disks, hard disks, magnetic tape, punch cards, CD-ROM, or any other physical medium with patterns of holes, a RAM, a PROM, an EPROM, a FLASH-EPROM, and any other memory chip or cartridge, or any other medium from which a computer can read.

Client device 104 can communicate with gateway 102 via different networks, such as Local Area Network ("LAN"), a Wide Area Network ("WAN"), or a wireless network via a Virtual Private Network ("VPN"), for example, or a combination thereof. Also, gateway 102 and client device 104 can communicate order and market related information using any messaging protocols, such as any proprietary messaging protocols. However, it should be understood that different networks and different messaging protocols could also be used.

When client device 104 receives market information and order related information from exchange 100, the received information may be displayed to the trader(s) on the visual output device or display device of client device 104. However, it should be understood that the information could be provided to a trader using other means such as sound. The output device can be any display device. For example, the display could be a CRT-based video display, an LCD-based or a gas plasma-based flat-panel display, a display that shows three-dimensional images, or some other type of display.

Upon viewing the market information or a portion thereof, a trader may wish to send orders to an exchange, cancel orders, change orders, query an exchange, and so on. To do so, the trader may input various commands or signals into client device 104 such as by typing into a keyboard, inputting commands through a mouse, or inputting commands or signals through some other input device. For instance, a trader may click a mouse button to initiate an order to buy a particular quantity of the tradeable object at a particular price. Then, client device 104 preferably generates transaction information. There are many different types of messages and/or order types that can be submitted, all of which may be considered various types of transaction information. Once generated, transaction information is sent from client device 104 to host exchange 100 over communication links.

In the preferred embodiment, client device 104 uses software to create specialized interactive trading screens on terminals associated with them. Trading screens preferably enable traders to, among other things, enter and execute orders, obtain market quotes, and monitor positions. The range and quality of features available to the trader on his or her trading screen may vary according to the specific software application being run. In addition to or in place of the interactive trading screens, client device 104 could run automated types of trading applications.

The preferred embodiment may be implemented on any type of trading screen, therefore, details regarding the trading screen are not necessary to understand the present invention. However, in one embodiment, one type of trading screen that can be used is provided by a commercially available trading application referred to as X_TRADER® from Trading Technologies International, Inc. of Chicago, Ill. X_TRADER® also provides an electronic trading interface, referred to as MD Trader™, in which working orders and/or bid and ask quantities are displayed in association with a static price axis or scale. Portions of the X_TRADER® and the MD Trader™-style display are described in U.S. patent application Ser. No. 09/590,692, entitled "Click Based Trading With Intuitive Grid Display of Market Depth," filed on Jun. 9, 2000, U.S. patent application Ser. No. 09/971,087, entitled "Click Based Trading With Intuitive Grid Display of Market Depth and Price Consolidation," filed on Oct. 5, 2001, U.S. patent application Ser. No. 10/125,894, entitled "Trading Tools For Electronic Trading," filed on Apr. 19, 2002, and U.S. patent application Ser. No. 10/376,417, entitled "A System and Method for Trading and Displaying Market Information in an Electronic Trading Environment," filed on Feb. 28, 2003, the contents of each are incorporated herein by reference. However, it should be understood that orders in the system illustrated in FIG. 1 could also be placed using any other trading application as well. Additionally, the preferred embodiments are not limited to any particular product that performs translation, storage, and display function.

Figure 2:
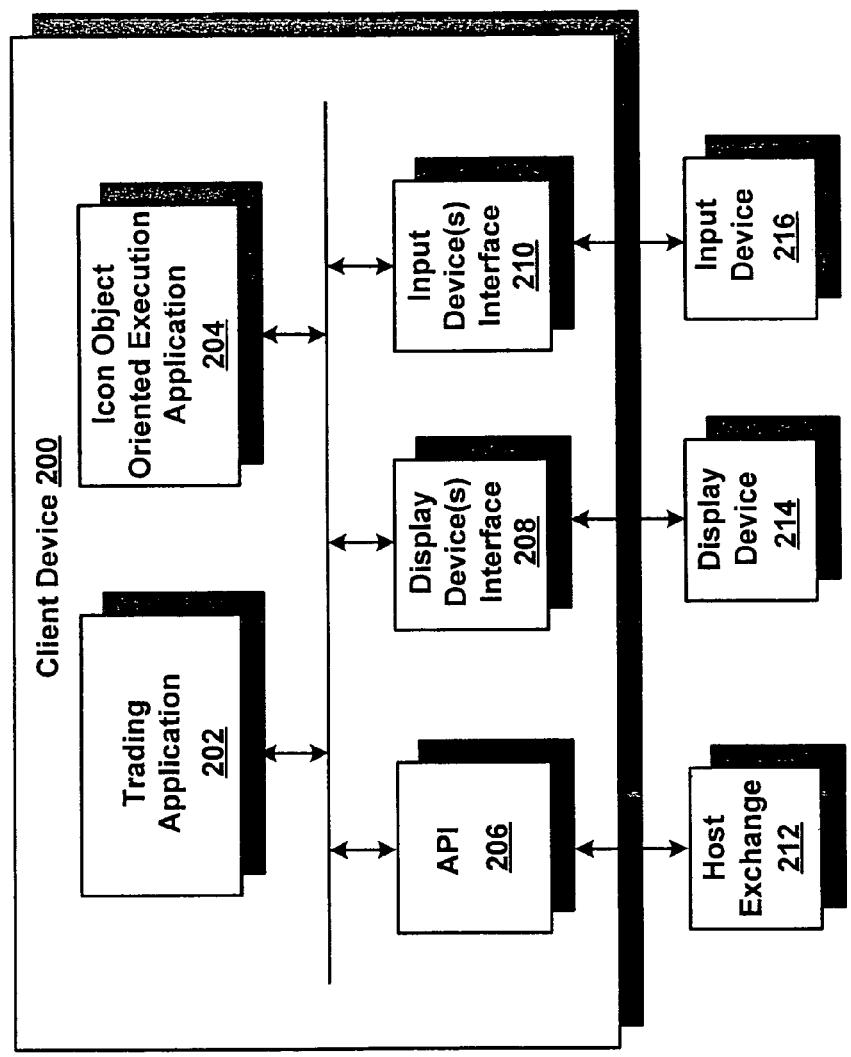
FIG. 2 is a block diagram illustrating an example client device that can be used to carry out the example embodiments.

FIG. 2 is a block diagram illustrating an example client device 200, which may be similar to the type of client device 104 shown in FIG. 1. The client device 200 can be any particular type of computing device, examples of which were enumerated above. According to the preferred embodiments, the client device 200 has a trading application 202 and an icon oriented execution application 204, both of which could be stored in a memory unit. For example, the trading application 202, when executed, may arrange and display market information in many different ways, depending on how the trader prefers to view the information.

The icon oriented execution application 204 can implement the embodiments for trading using a plurality of graphical icons representing order types being offered in relation to one or more tradeable objects selected by a trader for trading, the embodiments of which will be described in greater detail below. Preferably, the trading application 202 and the icon oriented execution application 204 have access to market information through an application programming interface ("API") 206, and the applications can also forward transaction information to the host exchange 212 via the API 206. Also, the trading application 202 and/or the icon oriented execution application 204 could receive other types of data, such as news related data, through the API 206 from outside sources.

Additionally, the trading application 202 and the icon oriented execution application 204 could receive signals from an input device 216 via an input device interface 210, and can be given the ability to send signals to a display device 214 via a display device interface 208, the embodiments of which will be described in greater detail below.

III. Icon Oriented Representation of Trading Strategies

Figure 3:
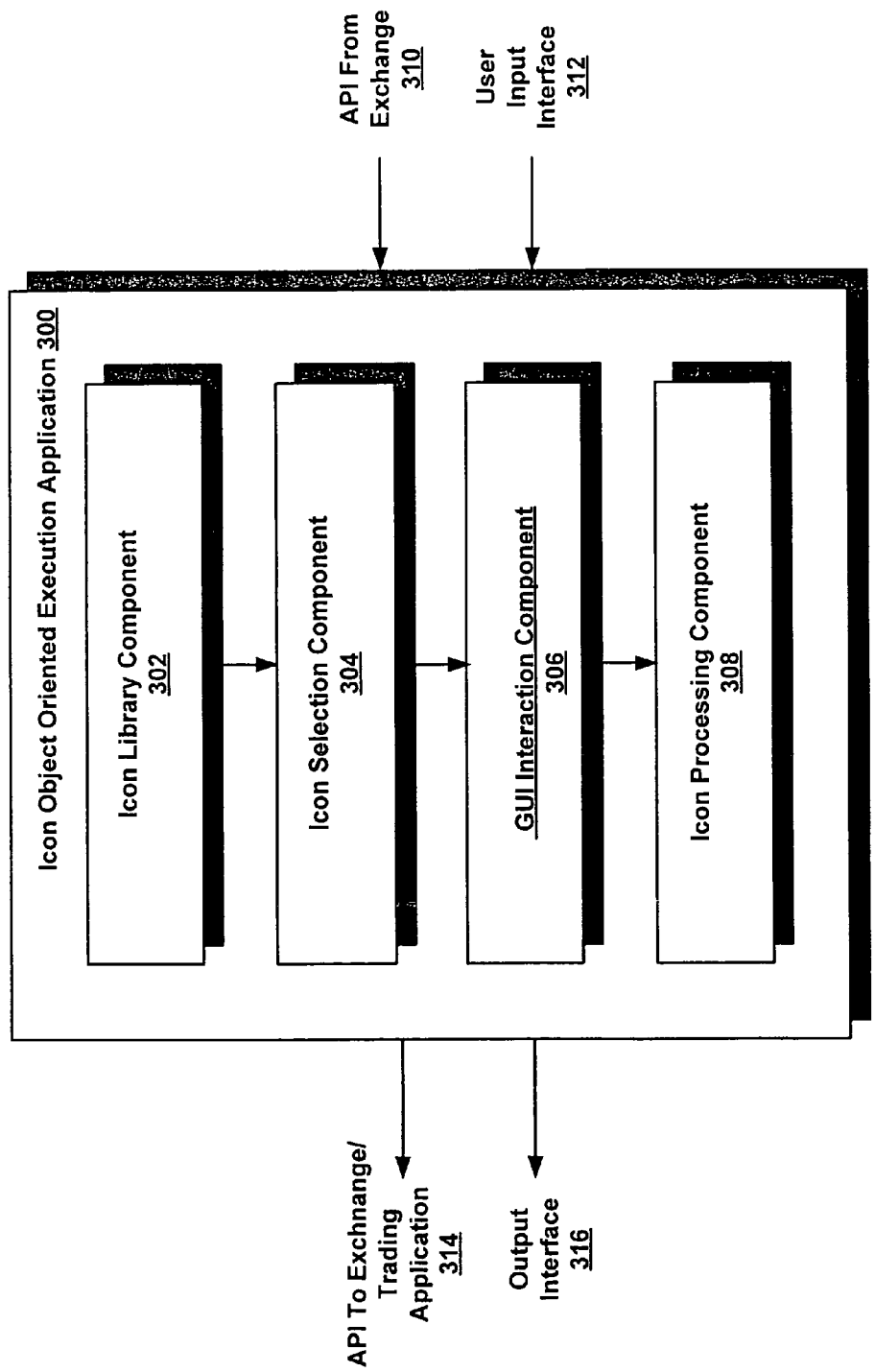
FIG. 3 is a block diagram illustrating an example icon oriented execution application that can be used to carry out the embodiments of the present invention.

FIG. 3 is a block diagram illustrating an icon object oriented execution application 300 that may be used for carrying out the present invention. The icon oriented execution application 300 includes an icon library component 302, an icon selection component 304, a graphical user interface ("GUI") interaction component 306, and an icon processing component 308. The components 302, 304, 306, and 308 may include software and/or hardware elements to perform their functions. However, it should be understood that the icon oriented execution application 300 may include more or fewer components than those illustrated in FIG. 3. Also, the illustrated components could be combined with other components. For example, the icon oriented execution application 300 could be combined with the trading application components of a particular client device.

The icon library component 302 may store different types of executions icons representing order types available at different exchanges. In one embodiment, the icons may be grouped based on an exchange, such that when a trader connects to an electronic exchange, the icon oriented execution application 300 may automatically retrieve and provide to the trader a specific set of icons corresponding to the order types available at the selected exchange. It should be understood that the embodiments described hereinafter are not limited to any specific exchange order types, and order types could include any equity, derivative, foreign exchange, or bond order types, for example.

According to example embodiments, the order execution icons may take many different graphical formats and can be user configurable. For example, the icon library component 302 can include a plurality of preset graphical icon representations corresponding to different order types being offered at one or more exchange, the example embodiments of which will be described in greater detail in reference to subsequent figures. However, the format of execution icons could also be modified based on the user preferences. The modified execution icons could also be saved in the icon library component 302.

Once a trader connects to an electronic exchange, the icon selection component 304 may select and display to a trader via the output interface 316 a set of icons corresponding to the order types being offered at the selected exchange. In addition to defining icons based on order types, different icons could also be used for different tradeable objects that a trader selects for trading. In one embodiment, a trader could select a symbol, a character, or an indicator to represent a tradeable object, and the selected representation for the tradeable object could be displayed in relation to order execution icons corresponding to different order types associated with the tradeable object. Also, it should be understood that the icons could take different formats to represent a buy order and a sell order, and the icon size could be used to represent and control an order quantity. Thus, each icon, when used by a trader, may be already auto-populated with a set of parameters including, but not limited to, an exchange identifier, a tradeable object identifier, a quantity, an order type identifier, and an identifier representing a buy or a sell.

The GUI interaction component 306 may allow a trader to initiate the process of placing an order to an exchange using one of the icons. According to one example embodiment, when a trader selects a tradeable object that she wishes to trade, the icon oriented execution application 204 may display to a trader an icon oriented execution interface that the trader may use in combination with the icons to preconfigure orders and/or trading strategies that can be submitted to one or more exchanges once one or more conditions defined by a trader are satisfied. It should be understood that conditions defining when an order should be submitted to an exchange can take many different formats. For example, an order associated with an icon can be sent to an exchange when the icon oriented execution application 300 detects placement of an icon on the graphical interface, or when a fill associated with another order is detected, or upon detecting a predetermined time defining when an order associated with an icon should be submitted to an exchange. However, it should be understood that different conditions defining when the trading application 202 should be ready to send an order or a plurality of orders associated with a trading strategy to one or more exchanges could be defined as well.

The icon oriented execution interface may take many different formats, some of which will be illustrated in the subsequent figures. For example, the interface may include a value axis, and a trader may use the value axis as a reference for placing order icons on the icon oriented execution interface. In one preferred embodiment, the value axis may display prices associated with a tradeable object selected by a trader for trading, any derivative of prices, or volatility of some user-selected values. However, it should be understood that the value axis is not limited to displaying prices, and it could also display different values as well, and more than one value axis could also be displayed in relation to the same interface to represent values associated with more than one tradeable object.

In another embodiment, the icon oriented execution interface could display one or more charts related to one or more tradeable object selected by a trader for trading. For example, the chart may display historical and real time quotes associated with the selected tradeable object. In such an embodiment, the chart may be displayed in relation to a time axis, and the time intervals displayed in relation to the time axis could be user configurable. Also, the time displayed in relation to the time axis may represent past and/or future time.

According to one example embodiment, when the application 204 activates the icon oriented execution interface and displays execution icons, a trader may select one of the icons and position the selected icon in relation to a value axis, such as in relation to a specific price level on a price axis, for example. To do that, a trader may drag an icon to a position on the interface corresponding to the desired price level at which the trader wishes to place an order. It should be understood that more than one point on the interface may correspond to a specific price level. For example, if a value axis corresponding to a price axis is displayed vertically, a trader may position an icon at a specific price by placing it at any point corresponding to a y-coordinate of the desired price displayed in relation to the price axis. Alternatively, if the graphical interface displays a chart, a trader could place an icon in relation to any point on the chart, and the application 204 could resolve a price level for an order corresponding to the icon based on the selected point on the chart. It should be understood that the trader could use any pointing means to drag an icon to a desired price level on the interface, and some of the means may include a mouse, a joystick, a stylus, or a human finger when an appropriate display interface is used.

In one embodiment, once the GUI interaction component 306 detects placement of an icon in relation to a specific price level on the provided graphical interface, for example, the trading application 202 can be ready to send an order corresponding to the icon when one or more conditions associated with the icon are satisfied. It should be understood that the conditions could be based on any trader-related events, exchange-related events, or may be related to detecting predefined states corresponding to other orders. For example, an order corresponding to an icon may be submitted to an exchange upon detecting a predetermined user input associated with a request to send the order to the exchange, or upon detecting that a trader's profit or loss reaches a predetermined level. The exchange-related events may be of many different types, such as detecting a predetermined price level related to one or more tradeable object, detecting a predetermined volume being traded, or may include any different events. Also, submission of an order corresponding to an icon may depend on detecting a fill corresponding to another order. However, it should be understood that the conditions triggering submission of an order to an exchange are not limited to the examples given above, and the conditions could take different formats as well. Also, in an alternative embodiment, an order corresponding to an icon can be automatically submitted to an exchange when the GUI interaction component 306 detects placement of the icon on a graphical interface. It should be understood that since any selected icon is auto-populated with order parameters, including, among other parameters, an order type, a tradeable object identifier, an order quantity, and a price that is resolved based on a position of the icon on the interface, the order may be sent to an exchange without any user intervention once one or more preset conditions are satisfied.

When an order is submitted to an exchange, the icon processing component 308 may change a format of an icon corresponding to the order to represent different states of the order. It should be understood that a trader could be alerted about many different order state changes, including order states occurring before an order is sent to an exchange, or any order state changes once an order is sent to an exchange. In one embodiment, the icon processing component 308 may change colors of the icon to represent different states of the order. For example, green could be used to represent an order that has been sent and successfully received at an exchange, red could represent an order that has been cancelled and confirmed by the exchange, blue could represent an order that has been sent to but not confirmed by an exchange, orange could represent an order that is contingent upon another order having been executed, purple could represent an order that has been cancelled but not confirmed by an exchange, and gray could represent an order that has a static state. It should be understood that the colors and order states are only examples, and a trader could configure trader-preferred colors and different order states as to which the trader wishes to be alerted.

Figure 4A:
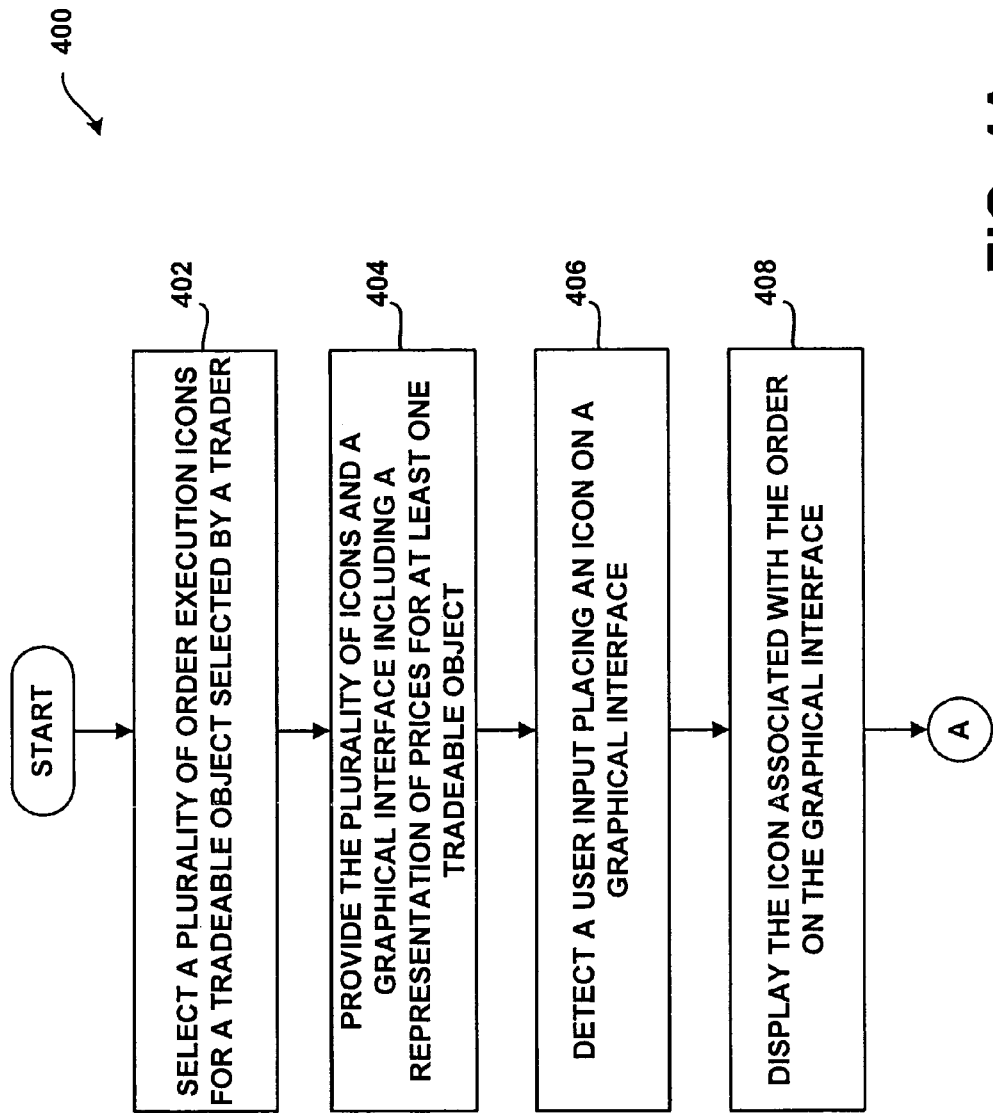
FIGS. 4A-4B are a flow chart illustrating an example method for trading using execution icons.
Figure 4B:
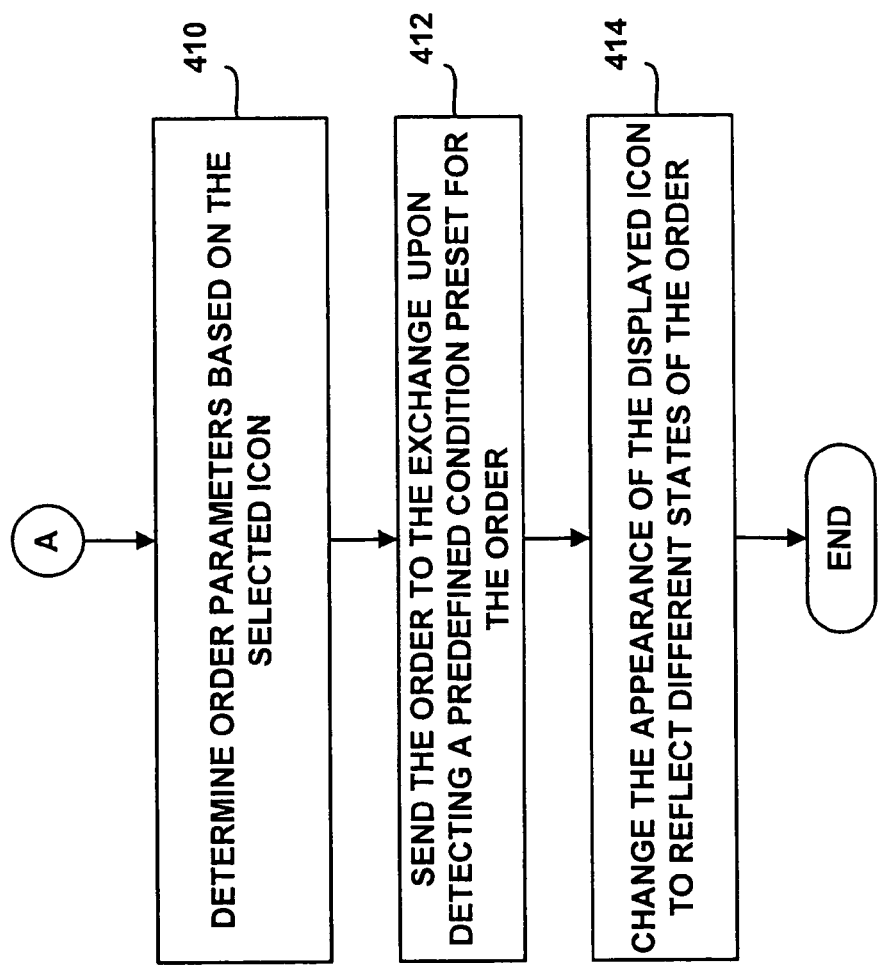

FIGS. 4A and 4B are a flow chart illustrating one example method 400 for trading using execution icons. The method 400 will be described in relation to the components illustrated in FIG. 3; however, it should be understood that different components could also be used to execute the method. Also, it should be understood that the flow chart only shows the functionality and operation of a possible implementation of the present embodiments. In this regard, each block may represent a module, a segment, or a portion of the code, which includes one or more executable instructions for implementing specific logical functions or steps in the process. Alternative implementations are included within the scope of the preferred embodiments of the present invention in which functions may be executed out of order from that shown or discussed, including substantially concurrent or in reverse order, depending on the functionality involved, as would be understood by those reasonably skilled in the art of the present invention.

At step 402, the icon selection component 304 may select a plurality of execution icons from an icon library to represent order types available for a tradeable object selected by a trader. According to an example embodiment, the icon selection component 304 may initiate the process of selecting the icons once a trader logs in to an exchange and selects tradeable objects that the trader wishes to trade. At step 404, the GUI interaction component 306 provides via the output interface 316 the plurality of execution icons and a graphical interface that a trader can use to place orders to an exchange. In one embodiment, the graphical interface, as described above, may include one or more value axes, such as a price axis, for example, and a trader may place icons in relation to the value axis. Also, the graphical interface can display a chart illustrating historical and real-time market data corresponding to the tradeable object. In such an embodiment, to place an order, a trader could position an icon corresponding to a desired order type in relation to any point on the chart, and the icon object oriented execution application 300 could resolve the price for the order based on the selected point on the chart. According to one preferred embodiment, the chart is displayed in relation to a price axis and a time axis; however, different embodiments are possible as well.

At step 406, the GUI interaction component 306 detects a trader's input placing an icon on the graphical interface, and, at step 408, the graphical interface displays the selected icon once the trader places the icon at a desired price level. Referring to FIG. 4B, at step 410, since the icon is auto-populated with the order parameters, the icon processing component 308 may determine order parameters based on the selected icon. Depending on the system configuration, at step 412, the icon object oriented execution application 300 or the trading application 202 may send the order to the exchange upon detecting one or more conditions defined for the order. As described in reference to earlier figures, the conditions can take many different formats, and can be based on market conditions, execution of other orders, time, or any other user-defined conditions.

When the order is submitted to the exchange, at step 414, the icon processing component 306 may start monitoring order state changes based on the information being provided by the exchange or based on user actions detected in relation to the icon. Then, when the icon processing component 306 detects an order state change, a format of the icon may be changed to reflect the order state change. As mentioned in earlier paragraphs, the icon processing component 308 can change colors of the icons based on a number of default or user-configured colors for different order states, such as exchange-based state changes, user action based state changes, or the combination thereof. For example, the exchange-based order state changes may include receiving a confirmation that an order has been received at an exchange, or receiving partial fill information for the order from the exchange, or that state of exchange or server connectivity. The trader-based order state changes may include, for example, detecting a user request to place, modify, or cancel an order. Also, a predefined color can be used to reflect a static state for an order, such as when the order is displayed on a graphical interface, but it has not been sent to an exchange yet. It should be understood that icon formats and colors could reflect different state changes as well. For example, icon formats could also change based upon user selection of icons, dragging of icon, or placing icons on the interface.

FIG. 5 illustrates a number of example order execution icons that can be used to represent different order types. More specifically, a rectangle can be used to represent a limit order 502, an octagon can be used to represent a stop order 504, an octagon with an interior "L" can be used to represent a stop limit order 506, an octagon with an interior star can be used for a trailing stop order 508, a square with an arrow pointing down can be used for a stop and reverse position order 510, and a circle can be used for a market order 512. It should be understood that the order types and graphical representations thereof in FIG. 5 are only examples, and different indicator representations for the same or different order types could also be used.

Figure 6:
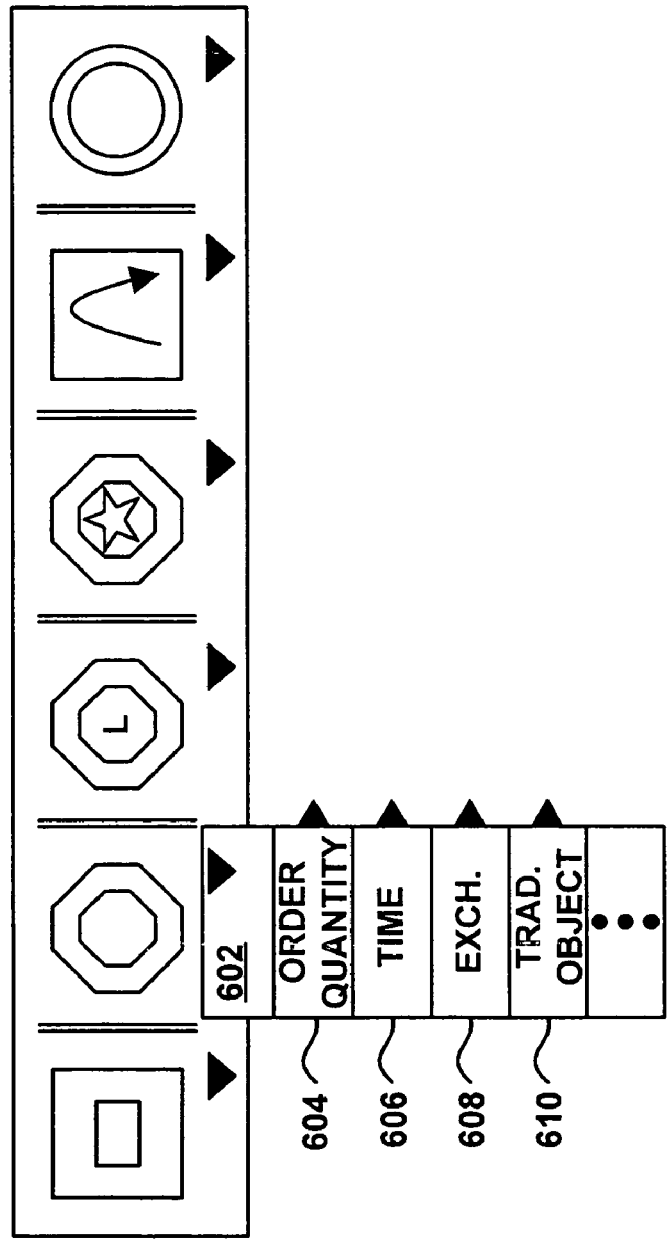
FIG. 6 is a block diagram illustrating one example order execution toolbar including a plurality of order type icons.

As mentioned earlier, when a trader logs in to an exchange and selects a tradeable object for trading, the icon object oriented execution application 204 may display a graphical interface and a toolbar displaying a number of icons corresponding to different order types that the trader can use to trade the tradeable object. FIG. 6 is a block diagram illustrating one example order execution toolbar 600 that can be displayed in combination with a graphical interface. The order execution toolbar 600 includes six order icons described in reference to FIG. 5. As shown in FIG. 6, each order icon may be associated with a pull down menu enabling a trader to modify default values that have been preset for the icon. As illustrated at 602, a trader can use the pull down menu to select an order quantity 604, a time when the order should be submitted to an exchange 606, or an exchange to which the tradeable object should be submitted 608 (such as when a tradeable object is offered at more than one exchange, and the trader is willing to have his order sent to any of the exchanges). Additionally, the order execution toolbar 600 may allow a trader to select another tradeable object that the trader wishes to trade by simply selecting a tradeable object 610 icon of the pull down menu. It should be understood that when a trader selects one of the icons on the pull down menu 602, another pull down menu may be displayed to represent choices associated with the selected icon. For example, the selection of the order quantity icon 604 on the pull down menu 602 may invoke another menu with specific quantity values that the trader may select for trading. It should be understood that the pull down menu options are only examples, and different order-related, exchange-related, or trader-related options could be provided as well.

In addition to placing single orders to an exchange using order execution icons, a trader could use the icons to build his trading strategies. A trading strategy may be defined with a complex order including two or more orders, where at least one order is dependent on one or more other orders in the group. For example, an Order Cancels Order ("OCO") is one example of such a complex order. The OCO typically includes a combination of two orders that control possible loss and possible profit that can be made when another independent order gets filled.

Figure 7:
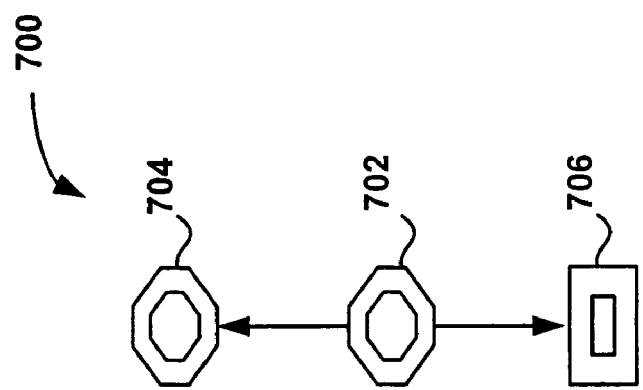
FIG. 7 is a block diagram illustrating one example trading strategy including an Order Cancel Order ("OCO")

One example embodiment for entering orders for a trading strategy including an OCO will be described in reference to three orders, an entry order, a profit order, and a risk order. FIG. 7 is a block diagram illustrating one example graphical representation of a trading strategy 700 including an OCO order using icons of the present invention. The trading strategy 700 includes an entry order 702 and an OCO order represented with icons 704 and 706. The graphically represented trading strategy 700 also illustrates order precedence defined using arrows, in this example. However, it should be understood that different graphical representations for defining order precedence could also be used, such as numerical indicators, for example. In this example embodiment, once the parent order associated with the icon 702 is filled, the OCO order pair is submitted to an exchange. It should be understood that the graphical representation of the trading strategy 700 could also represent a relationship between the OCO order pair corresponding to the icons 704 and 706. As known in the art, when one of the OCO orders gets filled, the other is automatically cancelled. Such order relationship may be represented by linking the two icons with a predefined line pattern/color, or by using any other user-defined graphical representation in relation to the icons.

FIG. 7 illustrates the entry order 702 using a stop order; however, the entry order could include different order types as well, such as a limit order, a stop limit order, or a market if touched ("MIT") order. Also, it is assumed in FIG. 7 that the icon 702 corresponds to a sell stop order, and the OCO order icons 704 and 706 are buy stop and buy limit orders, respectively. According to a preferred embodiment, when a trader places an entry order icon on the graphical interface, the icon processing component 308 may automatically detect whether the icon corresponds to a buy order or a sell order based on a position of the icon in relation to an inside market and an order type corresponding to the selected icon. For example, if a trader places a limit order icon or a market if touched order icon below the inside market, the icon processing component 308 will resolve such orders as buy orders. Then, if the same icons are placed above the inside market, the orders corresponding to the icons will be automatically marked as sell orders. In contrast, if a trader places a stop order icon or a stop limit order icon below the inside market, the icon processing component 308 will process such orders as a sell stop order and a sell stop limit order, respectively. If the same icons are placed above the inside market, the icons will correspond to buy orders. It should be understood that the example embodiments for automatic detection of buy and sell orders based on position of an icon in relation to an inside market are not limited to the order types given as examples above and could be applied in relation to different order types as well. Also, an icon may be automatically designated as a buy or a sell based on clicking the icon with a predetermined mouse button. For example, the right mouse button could correspond to a buy, and a left mouse button could correspond to a sell.

Referring back to FIG. 7, when a trader initiates creating the trading strategy 700 including an OCO order pair, the icon oriented execution application 300 may also control the sequence of positioning of order icons on the interface. In one preferred embodiment, the trader will first select and drop an entry order icon, the icon 702 in FIG. 7, then a risk stop, the icon 704, and finally an icon corresponding to a profit order, the icon 706 herein. However, it should be understood that different embodiments are possible as well, and the trader could position icons on the graphical interface in any trader defined sequence.

It should be understood that the trading strategy is not limited to using OCOs and could encompass any trader-defined strategy enabling a trader to link a plurality of different orders and to define a number of conditions that can be used by the icon oriented execution application 300 to determine when each order should be sent to an exchange. In one embodiment, a trader could define a trading strategy such that a fill of one order may trigger a process of sending another order corresponding to the same or different tradeable object to the same or different exchange.

Figure 8:
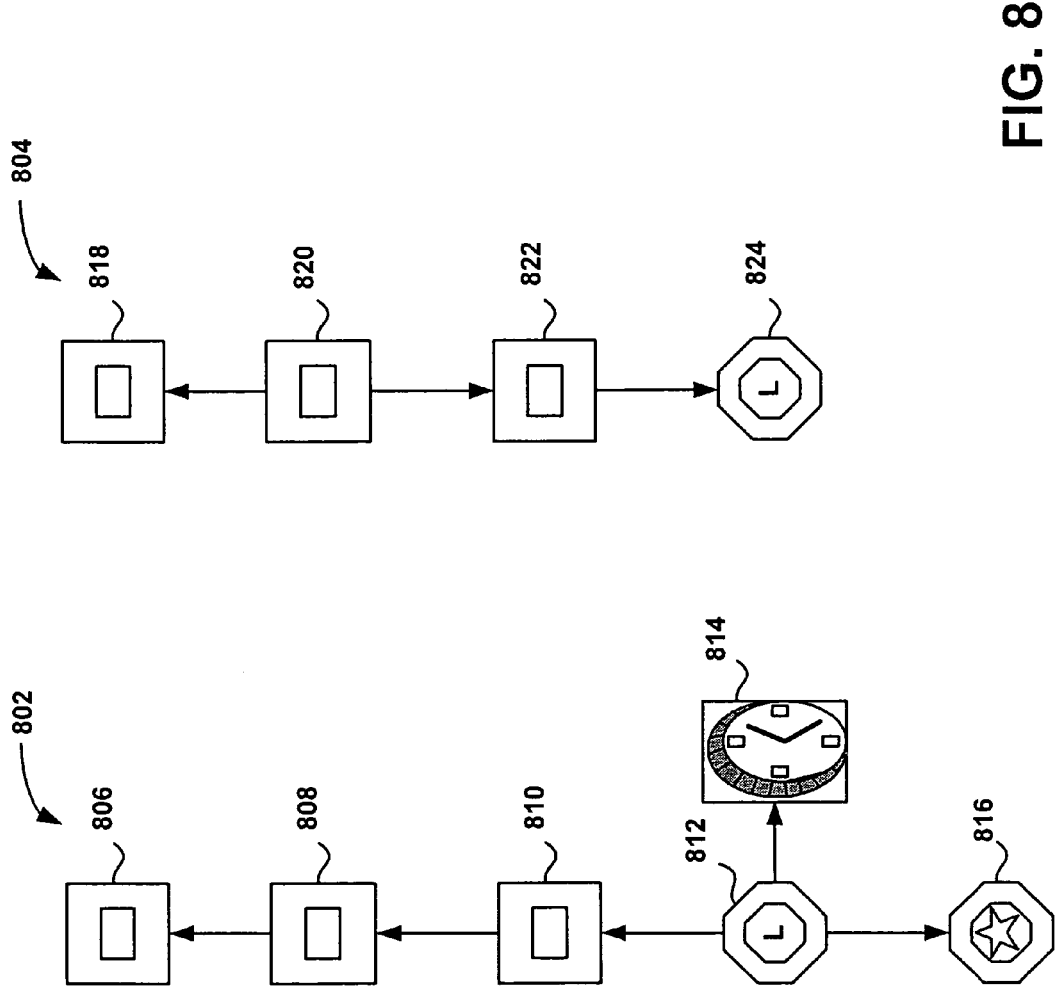
FIG. 8 is a block diagram illustrating two example trading strategies defined using a plurality of order execution icons.

FIG. 8 illustrates two example trading strategies 802 and 804 formed by connecting a plurality of order execution icons. It should be understood that the trading strategies illustrated in FIG. 8 are only examples, and more or fewer orders or different order types could be used to form trading strategies.

Referring to the trading strategy 802, the order execution icons 806-816 are connected by lines with arrows indicating the order execution precedence. In the embodiment illustrated in relation to the trading strategy 802, since all arrows are pointing away from the order 812, the order 812 is the main independent order that controls the execution of other dependent orders. It should be understood that a trader may define a number of conditions defining when each dependent order should be submitted to an electronic exchange. In one embodiment, the conditions may be based on a predetermined trigger detected in relation to another order. In such an embodiment, the order corresponding to the icon 806 could be submitted to an electronic upon detecting a fill in relation to the order corresponding to the icon 808, and the order quantity of the order associated with the icon 806 may depend on the filled order quantity of the order corresponding to the icon 808.

Also, the determination as to which dependent order is submitted to an electronic exchange may depend on a direction of the market. For example, when the order corresponding to the icon 812 is filled, the icon object oriented execution application 300 could either trigger placement of the order 816 or 810 depending on the current direction of the market. Alternatively, both orders can be automatically submitted to one or more exchanges, depending on the user configuration. It will be apparent to those of ordinary skill in the art that many different configurations are possible as well.

Referring back to FIG. 8, the trading strategy 802 also includes a timed order corresponding to the icon 814. The timed order is illustrated as an order that depends on the order corresponding to the icon 812. The timed order can be associated with a number of time-based conditions. For example, one time could define when the order 814 should be submitted to an exchange once a fill for the order 812 is detected. Alternatively, the timed order can be submitted to the exchange at some specified time when no order quantity associated with the order 812 is filled until some specified time. It should be understood that different embodiments are possible as well.

The second trading strategy includes four orders corresponding to icons 818-824, where the icon 820 corresponds to the main independent order, and the other icons correspond to the dependent orders. The execution and placement of the dependent order may depend on any conditions described above in relation to the trading strategy 802; however, it should be understood that different trader-defined rules could also be used. For example, in addition to making some orders contingent on execution of another order, an order quantity corresponding to a dependent order may be contingent on an order quantity that is filled for an independent order. In such an embodiment, if only a portion of the independent order is filled, and one or more dependent orders are respectively triggered, the original order quantities of the dependent orders may be dynamically adjusted based on the order quantity filled for the independent order.

FIG. 9 is a block diagram illustrating another example embodiment for representing a trading strategy 900. The trading strategy 900 includes three orders represented with three icons 902, 904, and 906. In the embodiment illustrated in FIG. 9, the icons include graphical indicators that may enable a trader to quicker distinguish an independent order from dependent orders. More specifically, the icon 904 corresponds to the independent order and includes two graphical indicators 910 and 912 on both sides of the icon 904 from which the lines connecting other orders originate. Then, dependent orders include single indicators, such as indicators 908 and 914 corresponding to dependent orders 902 and 906, respectively. It should be understood that the indicators corresponding to independent orders and dependent orders could also be color-coded to enable a trader to distinguish the two order types even quicker. Also, it should be understood that the indicators could take different formats as well, such as numbering of orders based on the order dependency.

In addition to indicators that represent order dependency, the order icons 902 and 906 corresponding to the dependent orders include time setting icons 916 and 918 that can be used by a trader to define a time when each order should be submitted to an exchange. For example, when the order icons are displayed on a graphical interface in relation to a time axis, a trader could drag each time setting indicator to a position on the interface corresponding to a desired future time when the trader wishes to have the order submitted to an exchange. In one embodiment where the axis displays past time, the axis could be dynamically moved with the movement to time setting indicator to enable a trader to position the indicator at the desired future time on the axis.

Also, indicators corresponding to orders may display an order quantity corresponding to each respective order. The order quantities corresponding to orders associated with the indicators 902-906 are displayed in rectangular boxes 920-924 attached to the left sides of each indicator. However, it should be understood that order quantities could be displayed in relation to the indicators in any other user-configurable manner, and order quantities corresponding to the orders could be modified by changing the size of each icon.

Figure 10B:
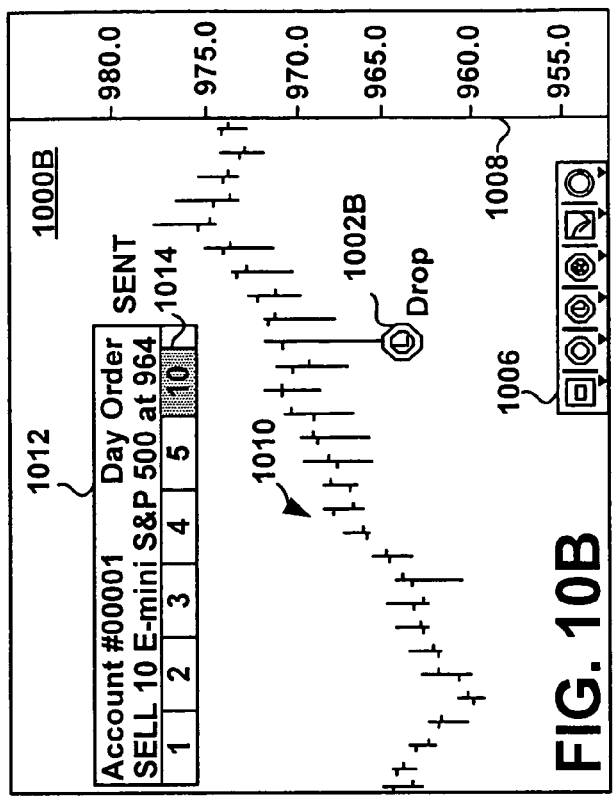
FIGS. 10A and 10B are block diagrams illustrating example graphical interfaces that be used by a trader to place orders.
Figure 10A:
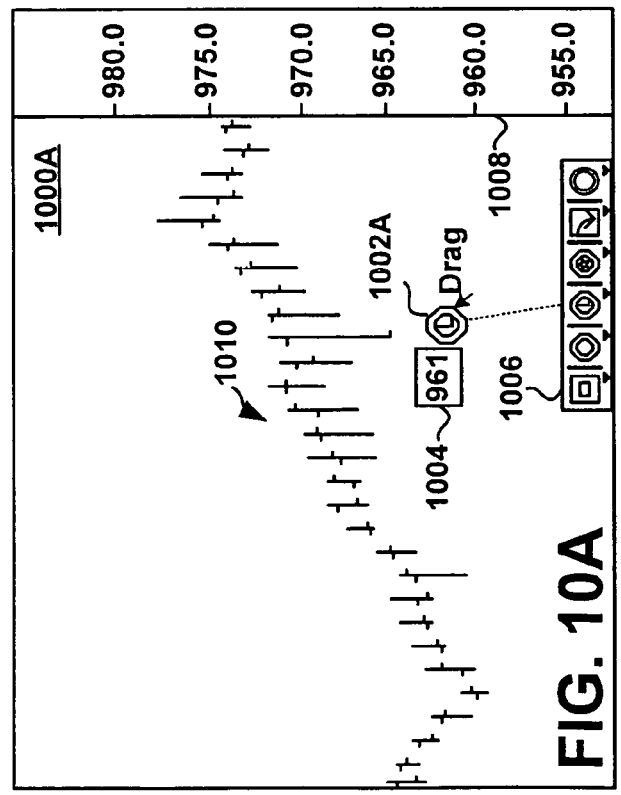

FIGS. 10A and 10B are block diagrams illustrating graphical interfaces 1000A and 1000B that can be used for preconfiguring orders using icons according to one example embodiment. In one embodiment, the icon oriented execution application 202 may display the graphical interface 1000A when a trader logs in to an exchange and selects a tradeable object that he wishes to trade.

Each graphical interface includes a value axis 1008 that in this example embodiment displays a number of price levels associated with the tradeable object. In one embodiment, the value axis 1008 may be a static axis or scale of values, such as prices, and the portion of the axis 1008 that is being viewed may be changed by scrolling up or down the axis or by entering a repositioning command. Alternatively, values do not need to be displayed in relation to the axis 1008. Also, the value axis can be displayed horizontally, n-dimensionally, or in any other fashion. It should be understood that while the example embodiments for using order execution indicators are described in reference to the display illustrated in FIGS. 10A and 10B, the present invention is not limited to any particular display. For example, the embodiments described herein could be used with the MD Trader™-style display. Portions of the MD Trader™-style display are described in U.S. patent application Ser. No. 09/590,692, entitled "Click Based Trading With Intuitive Grid Display of Market Depth," filed on Jun. 9, 2000, U.S. patent application Ser. No. 09/971,087, entitled "Click Based Trading With Intuitive Grid Display of Market Depth and Price Consolidation," filed on Oct. 5, 2001, U.S. patent application Ser. No. 10/125,894, entitled "Trading Tools For Electronic Trading," filed on Apr. 19, 2002, and U.S. patent application Ser. No. 10/376,417, entitled "A System and Method for Trading and Displaying Market Information in an Electronic Trading Environment," filed on Feb. 28, 2003, the contents of each are incorporated herein by reference.

Referring back to FIG. 10A, the interface 1000A also includes an order execution icon toolbar 1006 that has been described in greater detail in reference to FIG. 6. As described in reference to FIG. 7, the icon processing component 308 can automatically detect whether an order is a buy or a sell order based on a position of an icon in relation to an inside market, and further based on order type associated with the selected icon. However, rather than using the automatic detection, the order execution icon toolbar 1006 may enable a trader to select a buy order or a sell order in relation to each icon by simply selecting either buy or sell in a pull down menu associated with the desired icon. Alternatively, two different order execution icon toolbars could be displayed, with one, corresponding to buy orders and another corresponding to sell orders. Additionally, the interface 1000A provides historical and real-time market data in a chart format at 1010, where the market data illustrated at the most right hand side of the chart 1010 correspond to the present time. In the illustrated embodiment, the historical and real-time market data are displayed in a bar chart format. However, it should be understood that different types of charts or non-charting applications could also be used to represent historical and present time quotes.

According to one example embodiment, the interface 1000A allows a trader to electronically transmit orders to an exchange by selecting one of the icons from the icon toolbar 1006, and dragging the icon to a position on the interface corresponding to a predetermined price, as shown in relation to an icon 1002A. As mentioned in reference to earlier figures, the order corresponding to the icon can be automatically submitted to an exchange upon detecting one or more conditions. Alternatively, the order may be automatically sent to an exchange once the icon is dropped at a desired price level on the interface. Also, it should be understood that while the icon 1002A is being moved to a desired price level, the trader can view the price levels during the process of moving the icon to the desired price level. As illustrated in FIG. 10A, such prices can be displayed in relation to the icon 1002A, such as in a block illustrated at 1004. Also, as mentioned in reference to preceding figures, the icon object oriented execution application 204 can resolve the prices based on a position of the indicator in relation to the axis, such as based on a y-coordinate position of the icon on the interface in this particular example. Alternatively, if the trader selects a specific point on the chart, the application 204 can resolve the price for the new order using the selected point on the chart.

Referring to FIG. 10B, once the trader drops the icon at the desired price level, as shown at 1002B, the trading application 202 can be ready to send the order to an exchange once one or more conditions are satisfied. Also, the interface 1000B can display an order ticket 1012 reflecting order parameters when the order will be sent to an exchange. The order ticket may include trader-related as well as order status related information. The example order ticket 1012 includes a trader's account identifier, a tradeable object identifier associated with the order, a price level at which the order has been placed, and an order quantity. Also, the order ticket 1012 defines whether the order is a buy order or a sell order, and the status of the order. In the example given in relation to FIGS. 10A and 10B, the order is a sell order, and the displayed status of the order is "sent." It should be understood that the displayed status of the order may change as the icon object oriented execution application receives additional information from the exchange or detects a user action, such as a user canceling the order from the exchange. In one embodiment, a trader could cancel an order by simply dragging an icon corresponding to the order away from the graphical interface.

Alternatively, the interface could include a designated location to which a trader can drag an icon to cancel an order corresponding to the icon. However, it should be understood that different methods for canceling orders could also be used, such as detecting a predetermined key combination input, or clicking on an icon using a predefined mouse button.

Figure 11A:
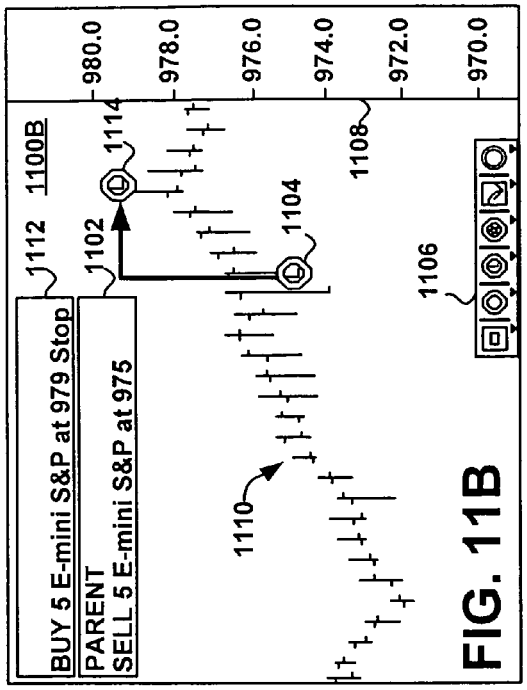
FIGS. 11A-11D are block diagrams illustrating example graphical interfaces that can be used by a trader to configure a trading strategy.
Figure 11B:
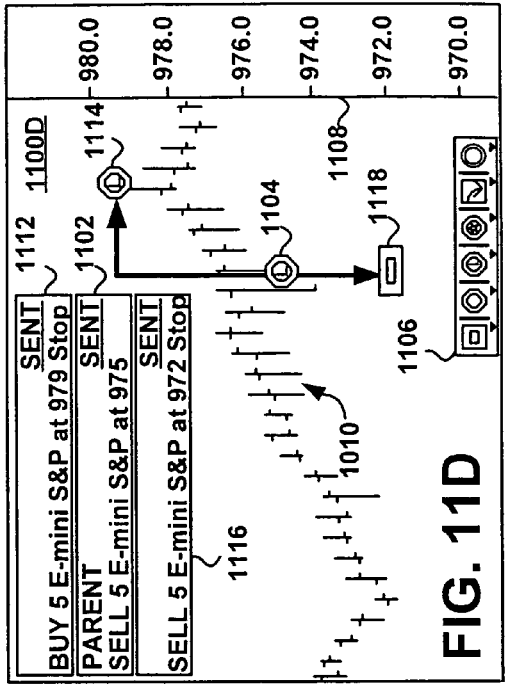

FIGS. 11A-11D are block diagrams illustrating graphical interfaces 1100A-1100B that can be used by a trader to configure trading strategies. The interfaces include the interface elements that have been described in relation to FIGS. 10A and 10B, including a price axis 1108, an icon toolbar 1106, and a chart 1110 providing historical and real time market data, such as any market quotes, related to a tradeable object. Referring to FIG. 11A, a trader may place a first order that will be sent to an exchange upon detecting one or more predefined conditions by selecting one of the icons on the toolbar 1106 and placing the icon at a desired price level, such as an icon 1104. In one embodiment, when the trader selects the icon 1104 from the toolbar, one of the options from a pull down menu may include a trading strategy option that, when selected by the trader in relation to the first order, may automatically launch the process of creating a trading strategy. In such an embodiment, the first icon selected by a trader may be associated with an independent parent order. Referring back to FIG. 11A, once the parent order icon is placed on the interface, the icon object oriented execution application 202 may display an order ticket 1102 defining potential order related and trader related information once the order corresponding to the icon is sent to an exchange.

Figure 11C:
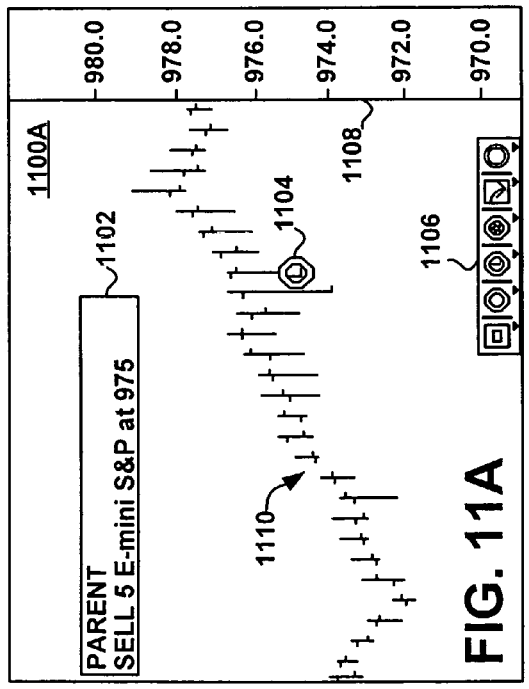
Figure 11D:
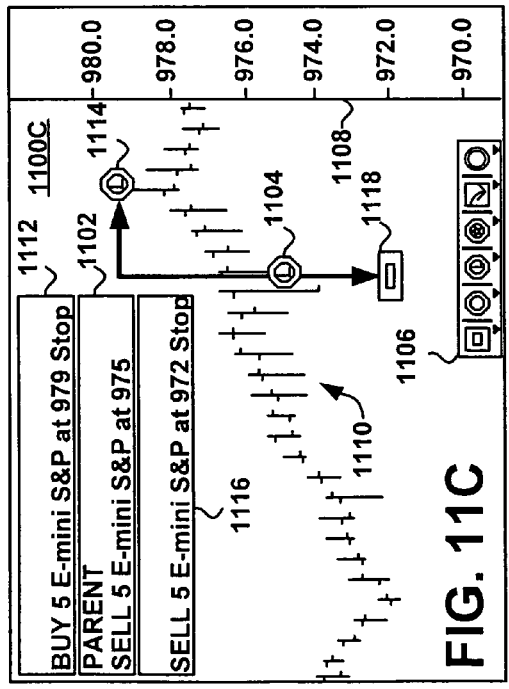

When the trader places the parent order icon on the interface, the next icon selected by the trader and corresponding to a dependent order may be graphically linked to the icon 1104 to illustrate the order execution precedence. For example, in FIG. 11B, the trader may select a second icon to correspond to a dependent order. Such icon, as illustrated at 1114, may be displayed in relation to, and may be linked to the icon 1104. When the trader drops the icon 1114 in relation to a specific point on the interface, an order ticket 1112 corresponding to the icon 1114 could be displayed in relation to the parent order ticket 1102. It should be understood, and as illustrated in FIG. 11C, the trading strategy may be associated with more than two orders. The graphical interface 1100C also illustrates an order ticket 1116 corresponding to a second dependent order associated with an icon 1118. FIG. 11D is a block diagram illustrating the trading strategy and order tickets with a modified order state statuses. More specifically, the status of each order, as illustrated in each order ticket, corresponds to the sent status.

FIGS. 11A-11D illustrate creating a trading strategy using a single graphical interface corresponding to the same tradeable object. However, it should be understood that a trader could create trading strategies by linking icons on different graphical interfaces, where the icons correspond to order types associated with different tradeable objects. Alternatively, as mentioned in reference to earlier figures, two or more value axes could be displayed in relation to a single graphical interface, and the value axes could correspond to different tradeable objects. For example, the value axes could be displayed in two different areas of the graphical interface, and an order icon can be automatically associated with a specific tradeable object based on the icon position in relation to one of the axes. Further, alternatively, two or more charts corresponding to different tradeable objects could be displayed on a single graphical interface, and positioning of an icon in relation to any point on one of the charts may be used to determine a tradeable object that a trader wishes to trade. It should be understood that different embodiments could also be used.

Figure 12A:
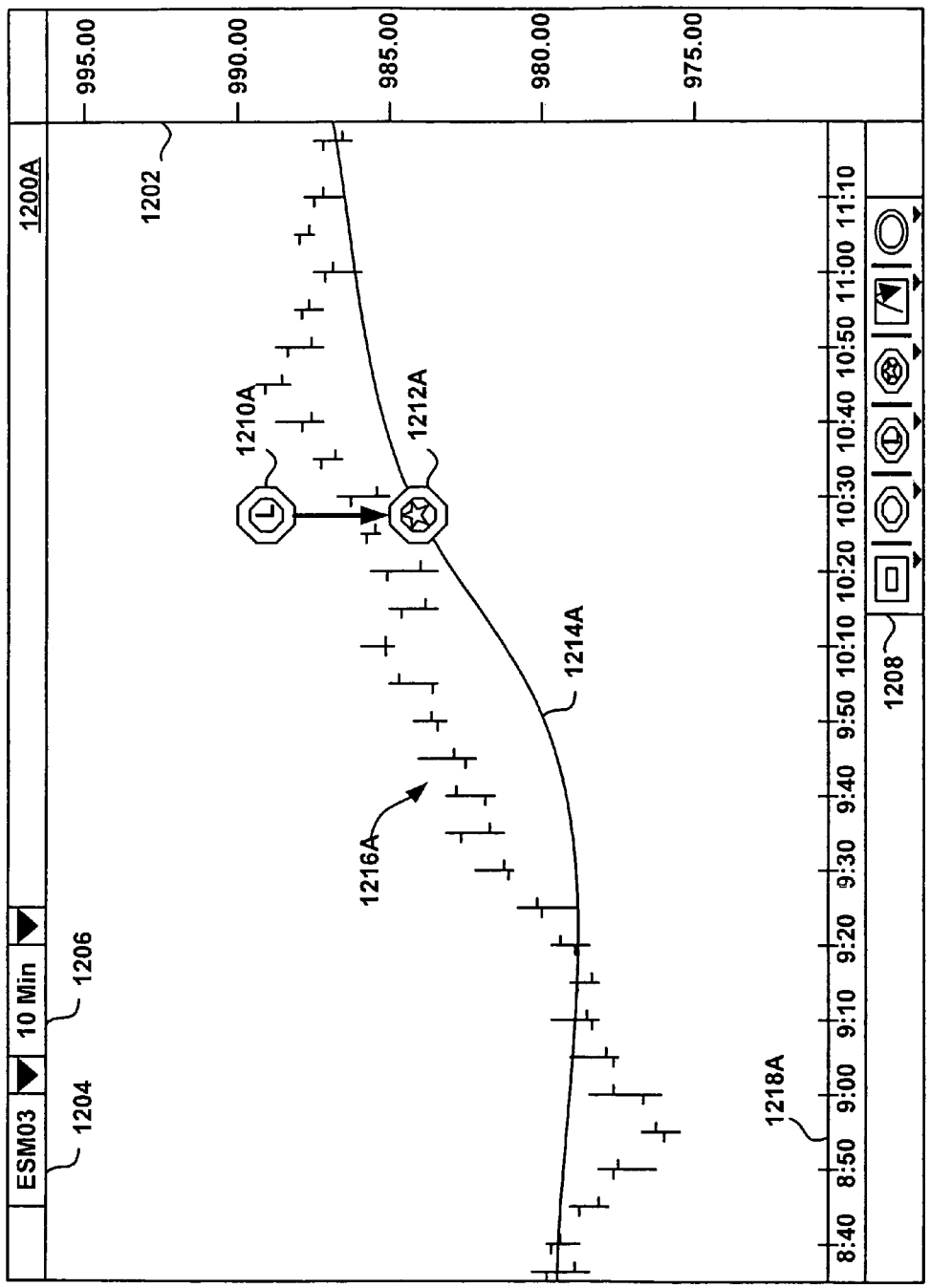
FIGS. 12A-12C are block diagrams illustrating example graphical interfaces that can be used to display different order states according to one example embodiment.
Figure 12B:
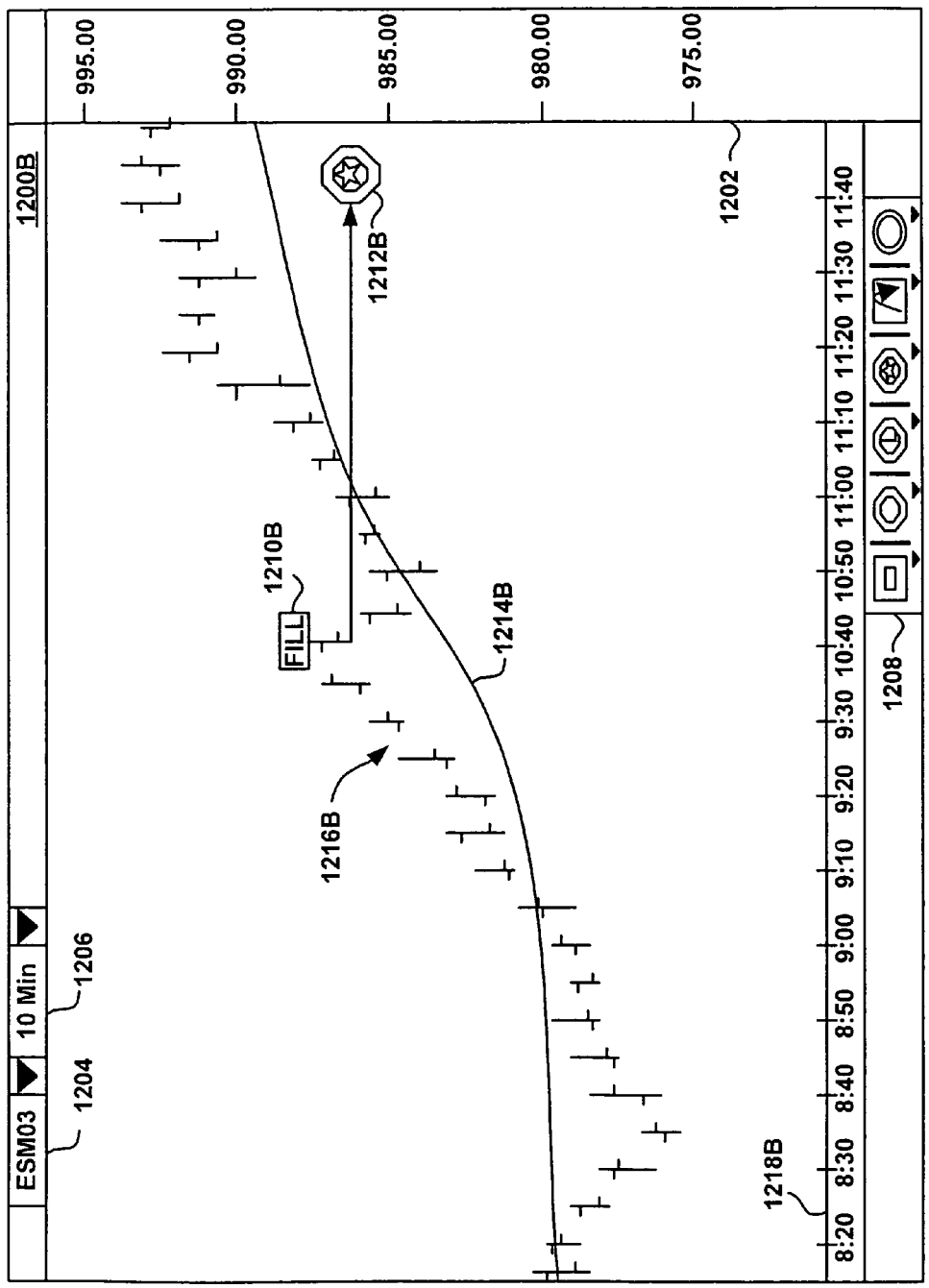
Figure 12C:
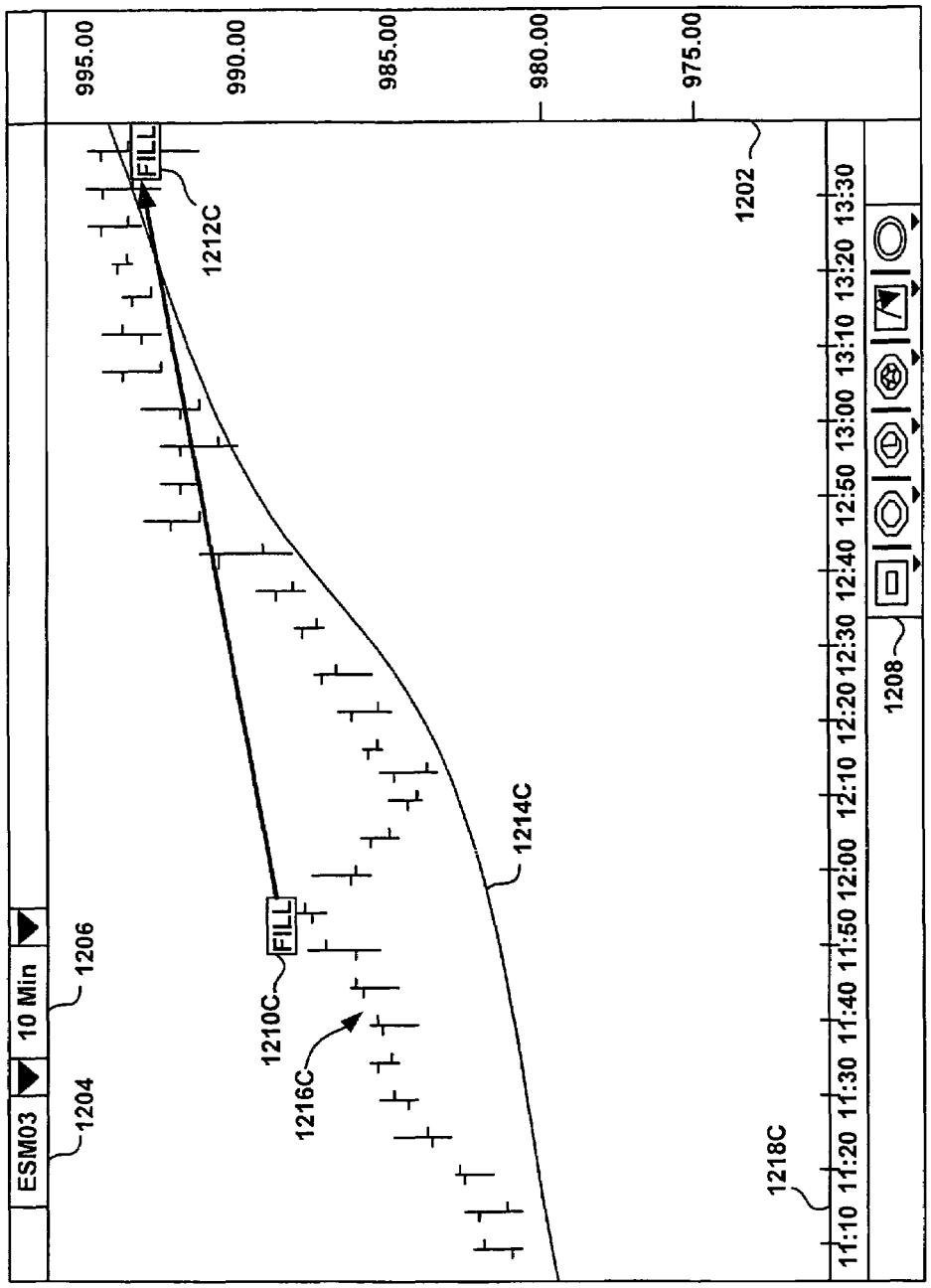

FIGS. 12A-12C are block diagrams illustrating graphical interfaces 1200A-1200C that can be used to display different states of an order according to one example embodiment. Referring to FIG. 12A, the interface 1200A includes a price axis 1202, a time axis 1218A, a chart 1216A illustrating historical and real-time quotes, and a graphical representation of a moving average 1214A that can be determined based on the values corresponding to the chart 1216A. The graphical interface 1200A also shows the identifier 1204 of the tradeable object corresponding to the chart and orders, and a time interval increments 1206 selectable by a trader and to be used in relation to the time axis 1218A. The interface 1200A also illustrates two icons 1210A and 1212A associated with two orders defined as a trading strategy. As illustrated in FIG. 12A, the icon 1212A is associated with a dependent order, the execution of which depends on the order corresponding to the icon 1210A.

FIG. 12B shows the graphical interface 1200A of FIG. 12A at the time when the first order is filled as illustrated with an icon 1210B. Also, the order corresponding to the icon 1212B is still pending at the exchange. Also, the chart 1216A and the moving average 1214A have been updated to reflect historical and current quotes related to the tradeable object, as shown at 1216B and 1214B.

FIG. 12C shows the graphical interface 1200A at the time when the second order gets filled. Once again, the chart 1216C and the moving average 1214C reflect the updated quotes and the updated moving average related to the tradeable object. Also, the format of the second indicator has been updated, as shown at 1212C, to reflect the status change of the second order.

Figure 13:
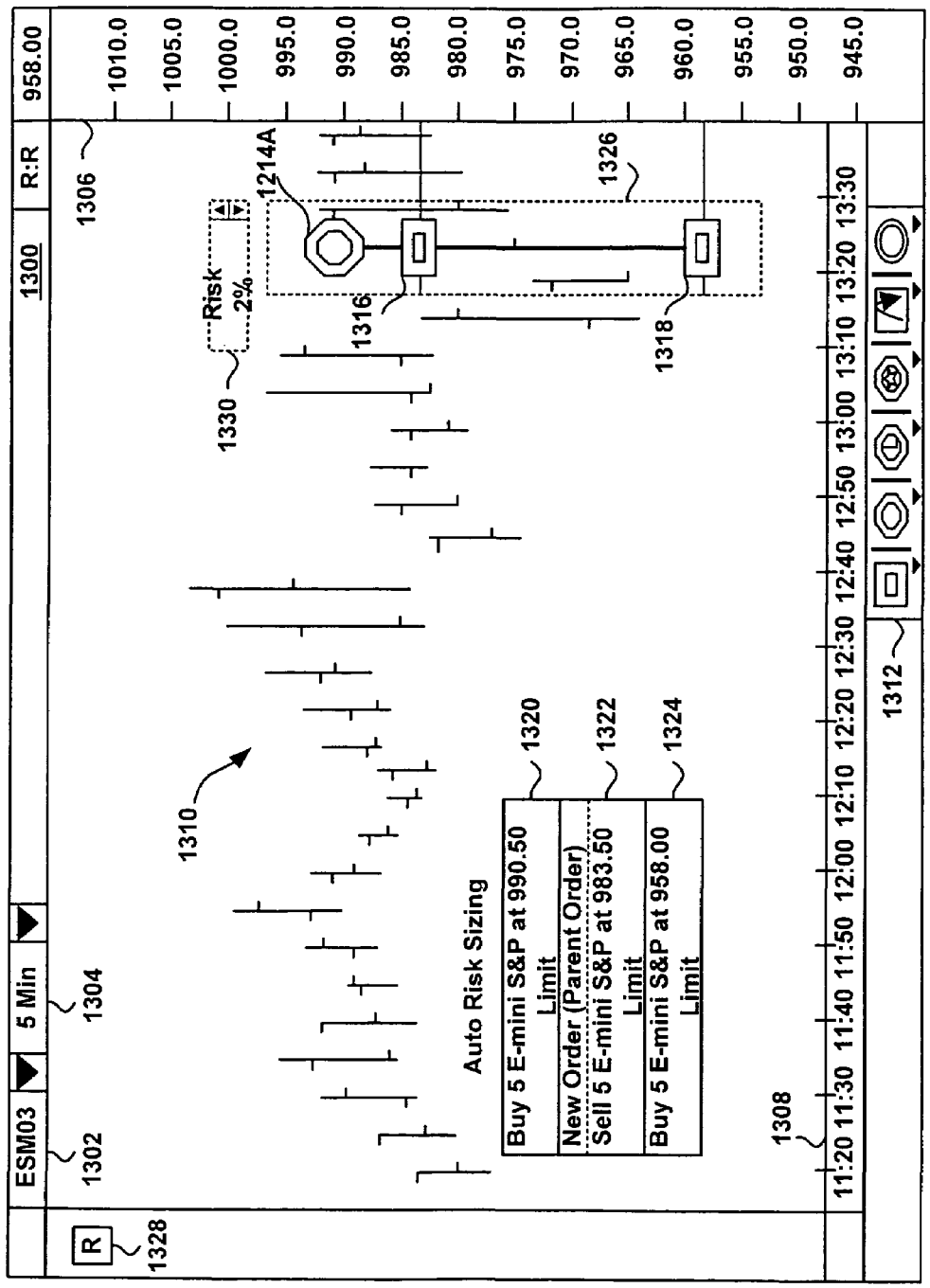
FIG. 13 is a block diagram illustrating a graphical interface that a trader can use to automatically adjust order quantities corresponding to orders associated with a trading strategy according to a preset risk management method.

FIG. 13 is a block diagram illustrating a graphical interface 1300 that can be used to by a trader to automatically control an order quantity of an order using a preset risk management method. Similarly to the earlier described graphical interfaces, the interface 1300 includes a tradeable object identifier 1302, a time increment selection input 1304 for a time axis, a price axis 1306, a time axis 1308, a quote chart 1310, and an icon toolbar 1312. The interface also displays a trading strategy including three orders 1314-1318 associated with three order tickets 1320-1324. According to one example embodiment, a trader can modify an order quantity of each or some orders corresponding to the trading strategy using a predefined risk management formula or method. Some of the risk management methods may include fixed fractional, constant leverage, Kelly's formula, Martingale, anti-Martingale, asymmetrical leverage, and many currently known or future methods.

Referring back to FIG. 13, a trader may automatically configure an order quantity of each or some orders corresponding to the trading strategy based on a preset formula by initially drawing a selection box around the icons corresponding to the trading strategy, as shown at 1326, and then selecting a risk "R" icon at 1328. Once the trader selects the risk icon 1328, the size of each order icon can be respectively changed to reflect the order quantity changes based on the risk management method. The order tickets 1320-1324 will reflect the order quantity changes as well.

The above description of the preferred embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

It will be apparent to those of ordinary skill in the art that methods involved in the system and method for trading in an electronic trading environment using execution icons may be embodied in a computer program product that includes one or more computer readable media. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

The invention claimed is:

1. A method for visually establishing a trading strategy for a tradeable object, comprising:

displaying, via a graphical user interface on a client device, a value axis having a plurality of value levels, each value level being associated with a price of a tradeable object traded at an electronic exchange;

selecting a subset of icons from an icon library having a plurality of icons including different types of execution icons graphically representing different order types available at different exchanges, where each of the plurality of icons is pre-populated with parameters for the type of order represented, where the subset of icons is selected based on types of orders available at the electronic exchange and includes at least one independent order icon graphically representing an independent order and at least one dependent order icon graphically representing a dependent order, the at least one independent order icon being configurable to create a trading strategy including multiple orders;

generating a toolbar for the subset of icons via the client device;

displaying the toolbar on the graphical user interface;

receiving a first user-initiated command via an input of the client device, the first user-initiated command selecting the independent order icon from the toolbar, creating the trading strategy including the independent order and moving the independent order icon to a first location relative to the value axis, the first location identifying a first price for the independent order for the tradeable object;

submitting the independent order to the electronic exchange according to detecting at least one pre-set condition associated with the independent order and for determining when the independent order is sent to the electronic exchange, the independent order having the first price;

displaying the independent order icon at the first location, the independent order icon graphically representing a state of the independent order based on market data from the electronic exchange related to the independent order;

receiving a second user-initiated command via the input device, the second user-initiated command selecting the dependent order icon from the toolbar, identifying the dependent order with the trading strategy and moving the dependent order icon to a second location relative to the value axis, the second location identifying a second price for the dependent order for the tradeable object;

displaying the dependent order icon at the second location, the dependent order icon graphically representing a state of the dependent order based on market data from the electronic exchange related to the dependent order;

submitting the dependent order to the electronic exchange according to at least the state of the independent order; and displaying a graphical indicator between the independent order icon and the dependent order icon showing the linking of the dependent order to the independent order.

2. The method of claim 1 where the value axis comprises a price derivative axis for the tradeable object.

3. The method of claim 1 where the pre-set condition comprises placement of the independent order icon at the first location.

4. The method of claim 1 where the pre-set condition comprises any of market conditions for the first tradeable object, execution of other orders for the tradeable object, trader-related events, exchange related event, and combinations thereof.

5. The method of claim 1 where detecting at least one pre-set condition associated with the independent order for determining when the independent order is sent to the electronic exchange comprises detecting a predetermined user input associated to send the independent order to the electronic exchange.

6. The method of claim 1 where detecting at least one pre-set condition associated with the independent order for determining when the independent order is sent to the electronic exchange comprises detecting a predetermined price level of the tradeable object.

7. The method of claim 1 where detecting at least one pre-set condition associated with the independent order for determining when the independent order is sent to the electronic exchange comprises detecting a predetermined price level of another tradeable object.

8. The method of claim 1 where detecting at least one pre-set condition associated with the independent order for determining when the independent order is sent to the electronic exchange comprises detecting a predetermined volume being traded for the tradeable object.

9. The method of claim 1 where detecting at least one pre-set condition associated with the independent order for determining when the independent order is sent to the electronic exchange comprises detecting a fill corresponding to another order.

10. The method of claim 1 where submitting the dependent order to the electronic exchange comprises detecting at least a partial fill of the independent order.

11. The method of claim 1, wherein the independent order icon graphically represents the state of the independent order and the dependent order icon graphically represents the state of the dependent order according to a plurality of colors, each defining a state of an order.

12. A computer readable medium having instructions stored thereon, which when executed by a processor cause the processor to carry out a method comprising:

displaying, via a graphical user interface on a client device, a value axis having a plurality of value levels, each value level being associated with a price of a tradeable object traded at an electronic exchange;

selecting a subset of icons from an icon library having a plurality of icons including different types of execution icons graphically representing different order types available at different exchanges, where each of the plurality of icons is pre-populated with parameters for the type of order, where the subset of icons is selected based on types of orders available at the electronic exchange and includes at least one independent order icon graphically representing an independent and at least one dependent order icon graphically representing a dependent order, the at least one independent order icon being configurable to create a trading strategy including multiple orders;

generating a toolbar for the subset of icons;

displaying the toolbar on the graphical user interface;

receiving a first user-initiated command via an input of the client device, the first user-initiated command selecting the independent order icon from the toolbar, creating the trading strategy including the independent order and moving the independent order icon to a first location relative to the value axis, the first location identifying a first price for the independent order for the tradeable object;

submitting the independent order to the electronic exchange according to detecting at least one pre-set condition associated with the independent order and for determining when the independent order is sent to the electronic exchange, the independent order having the first price;

displaying the independent order icon at the first location, the independent order icon graphically representing a state of the independent order based on market data from the electronic exchange related to the independent order;

receiving a second user-initiated command via the input device, the second user-initiated command selecting the dependent order icon from the toolbar, identifying the dependent order with the trading strategy and moving the dependent order icon to a second location relative to the value axis, the second location identifying a second price for the dependent order for the tradeable object;

displaying the dependent order icon at the second location, the dependent order icon graphically representing a state of the dependent order based on market data from the electronic exchange related to the dependent order;

submitting the dependent order to the electronic exchange according to at least the state of the independent order; and displaying a graphical indicator between the independent order icon and the dependent order icon showing the linking of the dependent order to the independent order.

13. The computer readable medium of claim 12 where the value axis comprises a price derivative axis for the tradeable object.

14. The computer readable medium of claim 12 where the pre-set condition comprises placement of the independent order icon at the first location.

15. The computer readable medium of claim 12 where the pre-set condition comprises any of market conditions for the first tradeable object, execution of other orders for the tradeable object, trader-related events, exchange related event, and combinations thereof.

16. The computer readable medium of claim 12 where detecting at least one pre-set condition associated with the independent order for determining when the independent order is sent to the electronic exchange comprises detecting a predetermined user input associated to send the independent order to the electronic exchange.

17. The computer readable medium of claim 12 where detecting at least one pre-set condition associated with the independent order for determining when the independent order is sent to the electronic exchange comprises detecting a fill corresponding to another order.

18. The computer readable medium of claim 12 where submitting the dependent order to the electronic exchange comprises detecting at least a partial fill of the independent order.

19. The computer readable medium of claim 12, wherein the independent order icon graphically represents the state of the independent order and the dependent order icon graphically represents the state of the dependent order according to a plurality of colors, each defining a state of an order.

20. A client device displaying a graphical interface for visually establishing a trading strategy, comprising:

a memory having an icon library having a plurality of icons including different types of execution icons configured to graphically represent order types available at different exchanges, where each of the plurality of icons is pre-populated with parameters for the type of order represented by the icon;

an icon identifier configured to select a subset of icons from the icon library based on types of orders available at an electronic exchange and includes at least one independent order icon graphically representing an independent order and at least one dependent order icon graphically representing a dependent order, the at least one independent order icon being configurable to create a trading strategy including multiple orders;

a processor configured to execute code including instructions to display a graphical user interface having:

a value axis having a plurality of value levels, each associated with a price of a tradeable object traded at an electronic exchange;

a toolbar for the subset of icons a user device configured to receive:

a first user-initiated command selecting the independent order icon from the toolbar, creating the trading strategy including the independent order and moving the independent order icon relative to a first location of the value axis to graphically represent a state of the independent order determined according to market data from the electronic exchange related to the independent order, the first location identifying a first price for the independent order for the tradeable object;

a second user-initiated command selecting the dependent order icon from the toolbar, identifying the dependent order with the trading strategy and moving the dependent order icon relative to a second location relative to the value axis to graphically represent a state of the dependent order determined according to market data from the electronic exchange related to the dependent order, the second location identifying a second price for the dependent order for the tradeable object, where the dependent order is linked to the independent order;

a graphical indicator displayed between the independent order icon and the dependent order icon showing the linking of the dependent order to the independent order; and an order router configured to submit the independent order as a buy or a sell to the electronic exchange according to detecting at least one pre-set condition associated with the independent order for determining when the independent order is sent to the electronic exchange and submitting the dependent order to the electronic exchange according to at least the state of the independent order.

21. The computing device of claim 20, wherein the value axis comprises a price derivative axis for the tradeable object.

22. The computing device of claim 20, where the independent order icon graphically represents the state of the independent order and the dependent order icon graphically represents the state of the dependent order according to a plurality of colors, each defining a state of an order.

23. The method of claim 1 where the subset of icons are selected from the icon library in response to a connection to the electronic exchange.

24. The method of claim 23 where the connection to the electronic exchange comprises logging onto the electronic exchange.

* * * * *